United States Patent
Uhlig et al.

(10) Patent No.: US 12,407,803 B1
(45) Date of Patent: *Sep. 2, 2025

(54) RECALIBRATING STEREOSCOPIC CAMERAS DURING VEHICLE OPERATION

(71) Applicant: Applied Intuition, Inc., Mountain View, CA (US)

(72) Inventors: Volkmar Uhlig, Cupertino, CA (US); Prannay Khosla, Mountain View, CA (US); Shaun M. Pacheco, Santa Clara, CA (US); Mohammadamin Khajehnejad, Hoboken, NJ (US); Ying Li, Palo Alto, CA (US); Bobak Farzin, Fraser, CO (US)

(73) Assignee: Applied Intuition, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/502,253

(22) Filed: Nov. 6, 2023

Related U.S. Application Data

(63) Continuation of application No. 18/329,437, filed on Jun. 5, 2023, now Pat. No. 11,909,944, which is a (Continued)

(51) Int. Cl.
| | |
|---|---|
| *H04N 13/246* | (2018.01) |
| *B60W 60/00* | (2020.01) |
| *G06T 7/593* | (2017.01) |
| *G06T 7/80* | (2017.01) |
| *H04N 13/00* | (2018.01) |
| *H04N 23/61* | (2023.01) |

(52) U.S. Cl.
CPC ........ *H04N 13/246* (2018.05); *B60W 60/001* (2020.02); *G06T 7/593* (2017.01); *G06T 7/85* (2017.01); *H04N 23/61* (2023.01); *B60W 2420/403* (2013.01); *H04N 2013/0081* (2013.01)

(58) Field of Classification Search
CPC ......... H04N 13/246; H04N 2013/0081; H04N 23/61; G06T 7/593; G06T 7/85; B60W 60/001; B60W 2420/403
See application file for complete search history.

(56) References Cited

U.S. PATENT DOCUMENTS

| | | | |
|---|---|---|---|
| 9,602,806 B1 * | 3/2017 | Stafford | H04N 13/243 |
| 10,489,912 B1 * | 11/2019 | Brailovskiy | H04N 13/204 |

(Continued)

*Primary Examiner* — Twyler L Haskins
*Assistant Examiner* — John H Morehead, III
(74) *Attorney, Agent, or Firm* — McDermott Will & Schulte LLP

(57) ABSTRACT

Recalibrating stereoscopic cameras during vehicle operation may include: determining a disparity between first image data from a first camera and second image data from a second camera, wherein the first camera and the second camera are in a stereoscopic configuration, and wherein the disparity comprises a difference in placement of one or more objects in the first image data relative to the second image data; and adjusting one or more of the first camera or the second camera, based on the disparity and sensor data from a sensor other than the first camera or the second camera, to calibrate the stereoscopic configuration of the first camera and the second camera to achieve stereoscopic camera distance functionality.

20 Claims, 11 Drawing Sheets

Related U.S. Application Data continuation-in-part of application No. 17/660,821, filed on Apr. 26, 2022, now Pat. No. 11,805,316, which is a continuation-in-part of application No. 17/676,569, filed on Feb. 21, 2022, now Pat. No. 11,849,225.

(56) References Cited

U.S. PATENT DOCUMENTS

| | | | |
|---|---|---|---|
| 10,582,186 B1 * | 3/2020 | Baldwin | H04N 13/243 |
| 10,832,418 B1 | 11/2020 | Karasev et al. | |
| 11,805,316 B2 * | 10/2023 | Hayes | H04N 23/815 |
| 11,849,225 B2 | 12/2023 | Uhlig et al. | |
| 11,909,944 B1 * | 2/2024 | Uhlig | H04N 23/815 |
| 2005/0146621 A1 * | 7/2005 | Tanaka | H04N 1/00132 |
| | | | 348/E7.081 |
| 2014/0146185 A1 * | 5/2014 | Kannermark | H04N 17/02 |
| | | | 348/187 |
| 2017/0237937 A1 * | 8/2017 | Motohashi | H04N 23/66 |
| | | | 348/148 |
| 2018/0070023 A1 * | 3/2018 | Oh | H04N 5/2625 |
| 2019/0279440 A1 * | 9/2019 | Ricci | G06Q 10/20 |
| 2019/0289282 A1 * | 9/2019 | Briggs | H04N 23/71 |
| 2019/0325580 A1 * | 10/2019 | Lukac | G06T 3/4038 |
| 2020/0175326 A1 * | 6/2020 | Shen | G05D 1/2465 |
| 2021/0099643 A1 * | 4/2021 | Agrawal | G06T 7/10 |
| 2021/0327092 A1 * | 10/2021 | Jiang | B60W 40/02 |
| 2021/0350137 A1 * | 11/2021 | Imes | H04N 23/64 |
| 2022/0050890 A1 * | 2/2022 | Karantzis | G06V 30/153 |
| 2022/0180131 A1 * | 6/2022 | Oblak | G01S 17/931 |
| 2022/0182551 A1 * | 6/2022 | Fang | H04N 23/62 |
| 2022/0188560 A1 * | 6/2022 | Dharia | H04N 23/45 |
| 2022/0210305 A1 * | 6/2022 | Feng | H04N 23/743 |
| 2022/0301188 A1 | 9/2022 | Yoon et al. | |
| 2022/0365210 A1 * | 11/2022 | Lind | G01S 15/42 |
| 2022/0385816 A1 * | 12/2022 | Jung | H04N 23/951 |
| 2022/0388535 A1 | 12/2022 | Singh et al. | |
| 2022/0392036 A1 | 12/2022 | Feng et al. | |

\* cited by examiner

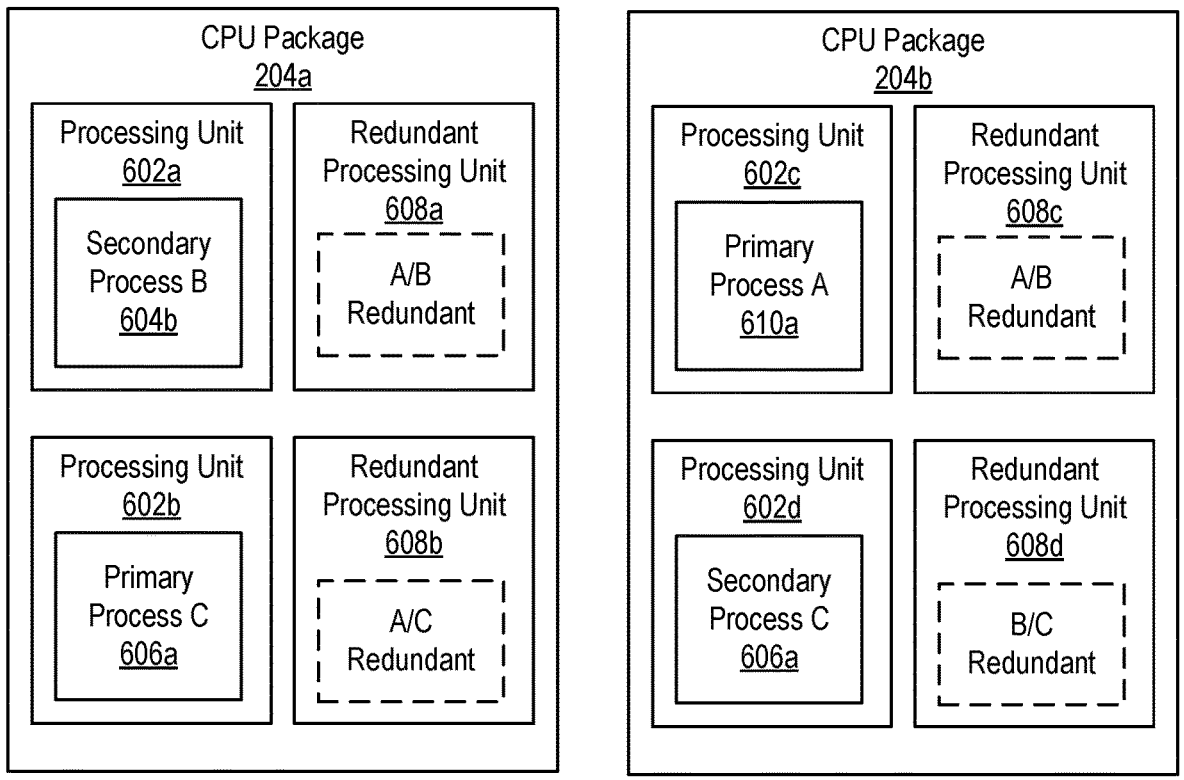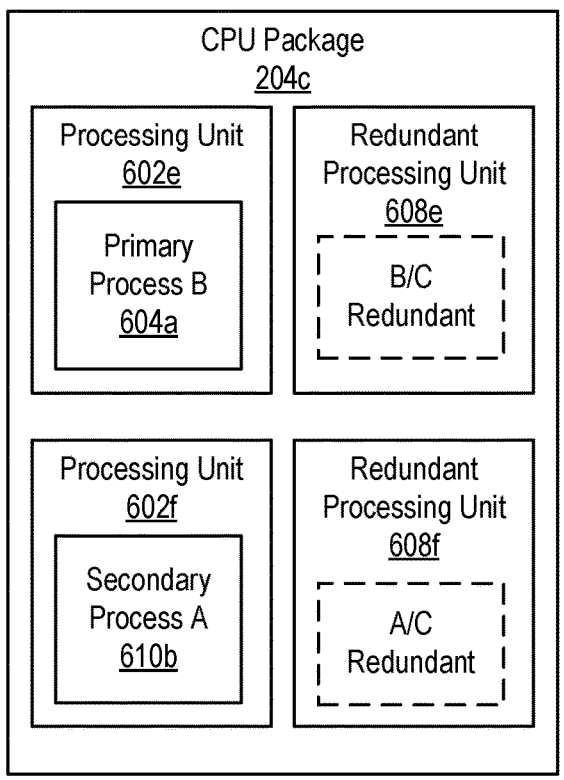
FIG. 6

Determine A Disparity Between First Image Data From A First Camera And Second Image Data From A Second Camera, Wherein The First Camera And The Second Camera Are In A Stereoscopic Configuration 802

Adjust One Or More Of The First Camera Or The Second Camera, Based On The Disparity And Sensor Data From A Sensor Other Than The First Camera And The Second Camera, To Calibrate The Stereoscopic Configuration Of The First Camera And The Second Camera To Achieve Stereoscopic Camera Distance Functionality 804

Modify, Based On The Disparity And The Sensor Data, Data Describing A Relative Positioning Of The First Camera And The Second Camera 806

Provide, Based On The Disparity And The Sensor Data, A Command To Crop Image Data From One Or More Of The First Camera Or The Second Camera Using A Modified Optical Center 808

FIG. 8

```
┌─────────────────────────────────────────────────────────────────┐
│ Determine A Disparity Between First Image Data From A First      │
│ Camera And Second Image Data From A Second Camera, Wherein       │
│ The First Camera And The Second Camera Are In A Stereoscopic     │
│ Configuration 802                                                │
└─────────────────────────────────────────────────────────────────┘
                                │
                                ▼
┌─────────────────────────────────────────────────────────────────┐
│ Adjust One Or More Of The First Camera Or The Second Camera,     │
│ Based On The Disparity And Sensor Data From A Sensor Other Than  │
│ The First Camera And The Second Camera, To Calibrate The         │
│ Stereoscopic Configuration Of The First Camera And The Second    │
│ Camera To Achieve Stereoscopic Camera Distance Functionality 804 │
│                                                                  │
│   ╭──────────────────────────────────────────────────────────╮   │
│   │ Modify, Based On The Disparity And The Sensor Data, Data │   │
│   │ Describing A Relative Positioning Of The First Camera    │   │
│   │ And The Second Camera 806                                │   │
│   ╰──────────────────────────────────────────────────────────╯   │
│                                                                  │
│   ╭──────────────────────────────────────────────────────────╮   │
│   │ Provide, Based On The Disparity And The Sensor Data, A   │   │
│   │ Command To Crop Image Data From One Or More Of The First │   │
│   │ Camera Or The Second Camera Using A Modified Optical     │   │
│   │ Center 808                                               │   │
│   ╰──────────────────────────────────────────────────────────╯   │
└─────────────────────────────────────────────────────────────────┘
                                │
                                ▼
┌─────────────────────────────────────────────────────────────────┐
│ Generate One Or More Autonomous Driving Decisions Based On       │
│ Image Data From The First Camera And The Second Camera 902       │
└─────────────────────────────────────────────────────────────────┘
```

FIG. 9

RECALIBRATING STEREOSCOPIC CAMERAS DURING VEHICLE OPERATION

CROSS-REFERENCE TO RELATED APPLICATIONS

This is a continuation application for patent entitled to a filing date and claiming the benefit of earlier-filed U.S. patent application Ser. No. 18/329,437, filed on Jun. 5, 2023, herein incorporated by reference in its entirety, which is a continuation in-part application U.S. Pat. No. 11,805,316, issued Oct. 31, 2023, which is a continuation in-part of U.S. patent application Ser. No. 17/676,569, filed Feb. 21, 2022.

BACKGROUND

Field of the Invention

The field of the invention is autonomous vehicle systems, or, more specifically, methods, apparatus, and products for camera calibration.

SUMMARY

In an embodiment, a system for dynamic calibration of cameras in a stereoscopic configuration includes using input from another sensor to calibrate the cameras. For example, the other sensor may be a radar, LiDAR, or other sensor. The cameras may be used to determine distance to determine driving tasks for an autonomous vehicle and, from time to time, may need to be recalibrated to ensure that distance readings from the cameras continue to be accurate.

Dynamic calibration of cameras in a stereoscopic configuration may include: determining a disparity between first image data from a first camera and second image data from a second camera, wherein the first camera and the second camera are in a stereoscopic configuration, and wherein the disparity comprises a difference in placement of one or more objects in the first image data relative to the second image data; and adjusting one or more of the first camera or the second camera, based on the disparity and sensor data from a sensor other than the first camera and the second camera, to calibrate the stereoscopic configuration of the first camera and the second camera to achieve stereoscopic camera distance functionality.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

BRIEF DESCRIPTION OF THE DRAWINGS

FIG. 6 is an example view of process allocation across CPU packages for dynamic calibration of cameras in a stereoscopic configuration according to some embodiments of the present disclosure.

FIG. 8 is a flow chart of an example method for dynamic calibration of cameras in a stereoscopic configuration according to some embodiments of the present disclosure.

FIG. 9 is a flow chart of another example method for dynamic calibration of cameras in a stereoscopic configuration according to some embodiments of the present disclosure.

DETAILED DESCRIPTION

The terminology used herein for the purpose of describing particular examples is not intended to be limiting for further examples. Whenever a singular form such as "a," "an," and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes," and/or "including," when used, specify the presence of the stated features, integers, steps, operations, processes, acts, elements, and/or components, but do not preclude the presence or addition of one or more other features, integers, steps, operations, processes, acts, elements, components, and/or any group thereof. Additionally, when an element is described as "plurality," it is understood to mean two or more of such an element. However, as set forth above, further examples may implement the same functionality using a single element.

It will be understood that when an element is referred to as being "connected" or "coupled" to another element, the elements may be directly connected or coupled or via one or more intervening elements. If two elements A and B are combined using an "or," this is to be understood to disclose all possible combinations, i.e. only A, only B, as well as A and B. An alternative wording for the same combinations is "at least one of A and B." The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

Figure 1:
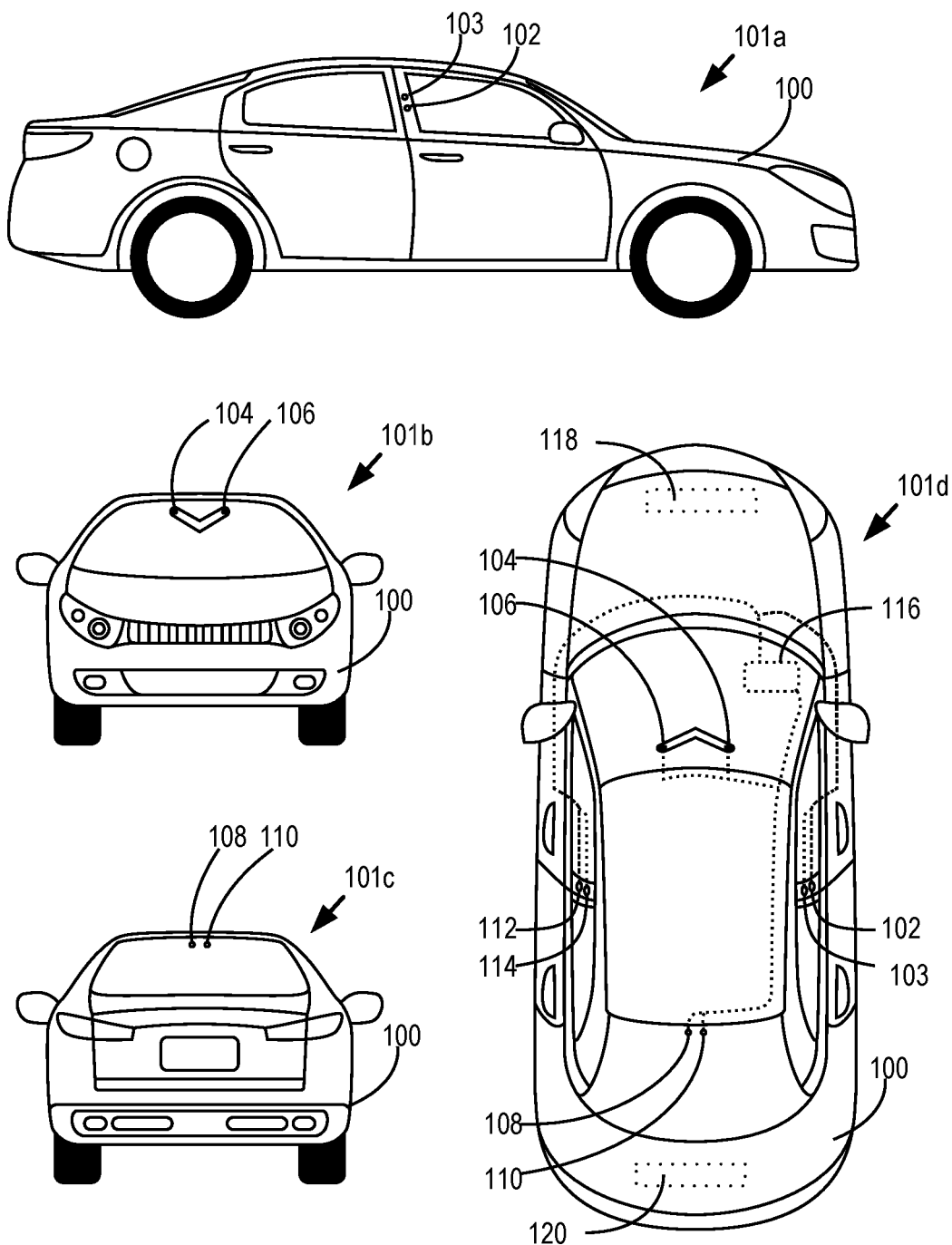
FIG. 1 shows example views of an autonomous vehicle for dynamic calibration of cameras in a stereoscopic configuration according to some embodiments of the present disclosure.

Dynamic calibration of cameras in a stereoscopic configuration may be implemented in an autonomous vehicle. Accordingly, FIG. 1 shows multiple views of an autonomous vehicle 100 configured for dynamic calibration of cameras in a stereoscopic configuration according to embodiments of the present disclosure. Right side view 101a shows a right side of the autonomous vehicle 100. Shown in the right-side view 101a are cameras 102 and 103, configured to capture image data, video data, and/or audio data of the environmental state of the autonomous vehicle 100 from the perspective of the right side of the car. Front view 101b shows a front side of the autonomous vehicle 100. Shown in the front view 101b are cameras 104 and 106, configured to capture image data, video data, and/or audio data of the environmental state of the autonomous vehicle 100 from the perspective of the front of the car. Rear view 101c shows a rear side of the autonomous vehicle 100. Shown in the rear view 101c are cameras 108 and 110, configured to capture image data, video data, and/or audio data of the environmental state of the autonomous vehicle 100 from the perspective of the rear of the car. Top view 101d shows a rear side of the autonomous vehicle 100. Shown in the top view 101d are cameras 102-110. Also shown are cameras 112 and 114, configured to capture image data, video data, and/or audio data of the environmental state of the autonomous vehicle 100 from the perspective of the left side of the car.

Further shown in the top view 101d is an automation computing system 116. The automation computing system 116 comprises one or more computing devices configured to control one or more autonomous operations (e.g., autonomous driving operations) of the autonomous vehicle 100. For example, the automation computing system 116 may be configured to process sensor data (e.g., data from the cameras 102-114 and potentially other sensors), operational data (e.g., a speed, acceleration, gear, orientation, turning direction), and other data to determine an operational state and/or operational history of the autonomous vehicle. The automation computing system 116 may then determine one or more operational commands for the autonomous vehicle (e.g., a change in speed or acceleration, a change in brake application, a change in gear, a change in turning or orientation). The automation computing system 116 may also capture and store sensor data. Operational data of the autonomous vehicle may also be stored in association with corresponding sensor data, thereby indicating the operational data of the autonomous vehicle 100 at the time the sensor data was captured.

Also shown in the top view 101d is a radar sensor 118. The radar sensor 118 uses radio waves to detect objects in the environment relative to the autonomous vehicle 100. The radar sensor 118 may also detect or track various attributes of such objects, including distance, velocity, angle of movement and the like. The measurements of the radar sensor 118 may be provided as sensor data (e.g., radar data) to the automation computing system 116.

The radar data from the radar sensor 118 may be used in a variety of ways to facilitate autonomous driving functionality. As an example, the radar sensor 118 may be used in isolation or in conjunction with other sensors, such as camera sensors, to track persistence of various objects. As described herein, persistence includes determining that a particular object identified at a particular instance (e.g., in camera sensor data, in radar sensor 118 data, or both) is the same object in subsequent instances. The radar sensor 118 may also facilitate detecting the size, shape, type, or speed of particular objects. These detected attributes may be correlated with or used to verify estimations of these attributes from camera sensors. As a further example, the radar sensor 118 may facilitate detecting voids in the environment where no object is present.

The radar sensor 118 provides several advantages over camera sensors in detecting the environment relative to the autonomous vehicle 100. For example, the radar sensor 118 provides for greater accuracy at longer distances. The radar sensor 118 may also provide for more accurate estimations of velocity or movement of objects. Moreover, as the radar sensor 118 does not operate in the optical spectrum, performance degradation of the radar sensor 118 in inclement weather is lesser than with camera sensors. Radar sensors 118 also provide some level of vertical resolution in some embodiments, with a tradeoff between distance and vertical resolution.

In some embodiments, the autonomous vehicle 100 may also include an additional radar sensor 120. For example, where the radar sensor 118 is positioned at a front bumper of the autonomous vehicle, the autonomous vehicle 100 may also include the additional radar sensor 120 positioned at the rear bumper. Such an additional radar sensor allows for multispectral (e.g., both visual and radar) coverage of the environment at the rear of the car. This provides advantages over ultrasonic sensors at the rear bumper which generally have a limited distance relative to radar.

Although the autonomous vehicle 100 if FIG. 1 is shown as car, it is understood that autonomous vehicles 100 configured for dynamic calibration of cameras in a stereoscopic configuration may also include other vehicles, including motorcycles, planes, helicopters, unmanned aerial vehicles (UAVs, e.g., drones), or other vehicles. Moreover, it is understood that additional cameras or other external sensors may also be included in the autonomous vehicle 100.

Dynamic calibration of cameras in a stereoscopic configuration in accordance with the present disclosure is generally implemented with computers, that is, with automated computing machinery. For further explanation, therefore, FIG. 2 sets forth a block diagram of automated computing machinery comprising an exemplary automation computing system 116 configured for dynamic calibration of cameras in a stereoscopic configuration according to specific embodiments. The automation computing system 116 of FIG. 2 includes at least one computer Central Processing Unit (CPU) package 204 as well as random access memory 206 ('RAM') which is connected through a high-speed memory bus 208 and bus adapter 210 to CPU packages 204 via a front side bus 211 and to other components of the automation computing system 116.

A CPU package 204 may comprise a plurality of processing units. For example, each CPU package 204 may comprise a logical or physical grouping of a plurality of processing units. Each processing unit may be allocated a particular process for execution. Moreover, each CPU package 204 may comprise one or more redundant processing units. A redundant processing unit is a processing unit not allocated a particular process for execution unless a failure occurs in another processing unit. For example, when a given processing unit allocated a particular process fails, a redundant processing unit may be selected and allocated the given process. A process may be allocated to a plurality of processing units within the same CPU package 204 or different CPU packages 204. For example, a given process may be allocated to a primary processing unit in a CPU package 204. The results or output of the given process may be output from the primary processing unit to a receiving process or service. The given process may also be executed in parallel on a secondary processing unit. The secondary processing unit may be included within the same CPU package 204 or a different CPU package 204. The secondary processing unit may not provide its output or results of the process until the primary processing unit fails. The receiving process or service will then receive data from the secondary processing unit. A redundant processing unit may then be selected and have allocated the given process to ensure that two or more processing units are allocated the given process for redundancy and increased reliability.

The CPU packages 204 are communicatively coupled to one or more sensors 212. The sensors 212 are configured to capture sensor data describing the operational and environmental conditions of an autonomous vehicle. For example, the sensors 212 may include cameras (e.g., the cameras 102-114 of FIG. 1), accelerometers, Global Positioning System (GPS) radios, Lidar sensors, or other sensors. As described herein, cameras may include a solid state sensor 212 with a solid-state shutter capable of measuring photons or a time of flight of photons. For example, a camera may be configured to capture or measure photons captured via the shutter for encoding as images and/or video data. As another example, a camera may emit photons and measure the time of flight of the emitted photons. Cameras may also include event cameras configured to measure changes in light and/or motion of light.

Although the sensors 212 are shown as being external to the automation computing system 116, it is understood that one or more of the sensors 212 may reside as a component of the automation computing system 116 (e.g., on the same board, within the same housing or chassis). The sensors 212 may be communicatively coupled with the CPU packages 204 via a switched fabric 213. The switched fabric 213 comprises a communications topology through which the CPU packages 204 and sensors 212 are coupled via a plurality of switching mechanisms (e.g., latches, switches, crossbar switches, field programmable gate arrays (FPGAs)). For example, the switched fabric 213 may implement a mesh connection connecting the CPU packages 204 and sensors 212 as endpoints, with the switching mechanisms serving as intermediary nodes of the mesh connection. The CPU packages 204 and sensors 212 may be in communication via a plurality of switched fabrics 213. For example, each of the switched fabrics 213 may include the CPU packages 204 and sensors 212, or a subset of the CPU packages 204 and sensors 212, as endpoints. Each switched fabric 213 may also comprise a respective plurality of switching components. The switching components of a given switched fabric 213 may be independent (e.g., not connected) of the switching components of other switched fabrics 213 such that only switched fabric 213 endpoints (e.g., the CPU packages 204 and sensors 212) are overlapping across the switched fabrics 213. This provides redundancy such that, should a connection between a CPU package 204 and sensor 212 fail in one switched fabric 213, the CPU package 204 and sensor 212 may remain connected via another switched fabric 213. Moreover, in the event of a failure in a CPU package 204, a processor of a CPU package 204, or a sensor, a communications path excluding the failed component and including a functional redundant component may be established.

The CPU packages 204 and sensors 212 are configured to receive power from one or more power supplies 215. The power supplies 215 may comprise an extension of a power system of the autonomous vehicle 100 or an independent power source (e.g., a battery, a capacitor). The power supplies 215 may supply power to the CPU packages 204 and sensors 212 by another switched fabric 214. The switched fabric 214 provides redundant power pathways such that, in the event of a failure in a power connection, a new power connection pathway may be established to the CPU packages 204 and sensors 212.

Stored in RAM 206 is an automation module 220. The automation module 220 may be configured to process sensor data from the sensors 212 to determine a driving decision for the autonomous vehicle. The driving decision comprises one or more operational commands for an autonomous vehicle 100 to affect the movement, direction, or other function of the autonomous vehicle 100, thereby facilitating autonomous driving or operation of the vehicle. Such operational commands may include a change in the speed of the autonomous vehicle 100, a change in steering direction, a change in gear, or other commands. For example, the automation module 220 may provide sensor data and/or processed sensor data as one or more inputs to a trained machine learning model (e.g., a trained neural network) to determine the one or more operational commands. The operational commands may then be communicated to autonomous vehicle control systems 223 via a vehicle interface 222.

In some embodiments, the automation module 220 may be configured to determine an exit path for an autonomous vehicle 100 in motion. The exit path includes one or more operational commands that, if executed, are determined and/or predicted to bring the autonomous vehicle 100 safely to a stop (e.g., without collision with an object, without violating one or more safety rules). The automation module 220 may determine both a driving decision and an exit path at a predefined interval. The automation module 220 may then send the driving decision and the exit path to the autonomous vehicle control systems 223. The autonomous vehicle control systems 223 may be configured to execute the driving decision unless an error state has been reached. If an error decision has been reached, therefore indicating a possible error in functionality of the automation computing system 116, the autonomous vehicle control systems 223 may then execute a last received exit path in order to bring the autonomous vehicle 100 safely to a stop. Thus, the autonomous vehicle control systems 223 are configured to receive both a driving decision and exit path at predefined intervals, and execute the exit path in response to an error.

The autonomous vehicle control systems 223 are configured to affect the movement and operation of the autonomous vehicle 100. For example, the autonomous vehicle control systems 223 may activate (e.g., apply one or more control signals) to actuators or other components to turn or otherwise change the direction of the autonomous vehicle 100, accelerate or decelerate the autonomous vehicle 100, change a gear of the autonomous vehicle 100, or otherwise affect the movement and operation of the autonomous vehicle 100.

Further stored in RAM 206 is a data collection module 224 configured to process and/or store sensor data received from the one or more sensors 212. For example, the data collection module 224 may store the sensor data as captured by the one or more sensors 212, or processed sensor 212 data (e.g., sensor 212 data having object recognition, compression, depth filtering, or any combination of these). Such processing may be performed by the data collection module 224 in real-time or in substantially real-time as the sensor data is captured by the one or more sensors 212. The processed sensor data may then be used by other functions or modules. For example, the automation module 220 may use processed sensor data as input to determine one or more operational commands. The data collection module 224 may store the sensor data in data storage 218.

Also stored in RAM 206 is a data processing module 226. The data processing module 226 is configured to perform one or more processes on stored sensor data (e.g., stored in data storage 218 by the data collection module 224) prior to upload to an execution environment 227. Such operations can include filtering, compression, encoding, decoding, or other operations. The data processing module 226 may then communicate the processed and stored sensor data to the execution environment 227.

Further stored in RAM 206 is a hypervisor 228. The hypervisor 228 is configured to manage the configuration and execution of one or more virtual machines 229. For example, each virtual machine 229 may emulate and/or simulate the operation of a computer. Accordingly, each virtual machine 229 may comprise a guest operating system 216 for the simulated computer. Each instance of virtual machine 229 may host the same operating system or one or more different operating systems. The hypervisor 228 may manage the creation of a virtual machine 229 including installation of the guest operating system 216. The hypervisor 228 may also manage when execution of a virtual machine 229 begins, is suspended, is resumed, or is terminated. The hypervisor 228 may also control access to computational resources (e.g., processing resources, memory resources, device resources) by each of the virtual machines.

Each of the virtual machines 229 may be configured to execute one or more of the automation modules 220, the data collection module 224, the data processing module 226, or combinations thereof. Moreover, as is set forth above, each of the virtual machines 229 may comprise its own guest operating system 216. Guest operating systems 216 useful in autonomous vehicles in accordance with some embodiments of the present disclosure include UNIX™, Linux™, Microsoft Windows™, AIX™, IBM's iOS™, and others. For example, the autonomous vehicle 100 may be configured to execute a first operating system when the autonomous vehicle is in an autonomous (or partially autonomous) driving mode and the autonomous vehicle 100 may be configured to execute a second operating system when the autonomous vehicle is not in an autonomous (or partially autonomous) driving mode. In such an example, the first operating system may be formally verified, secure, and operate in real-time such that data collected from the sensors 212 are processed within a predetermined period of time, and autonomous driving operations are performed within a predetermined period of time, such that data is processed and acted upon essentially in real-time. Continuing with this example, the second operating system may not be formally verified, may be less secure, and may not operate in real-time as the tasks that are carried out (which are described in greater detail below) by the second operating system are not as time-sensitive the tasks (e.g., carrying out self-driving operations) performed by the first operating system.

Although the example included in the preceding paragraph relates to an embodiment where the autonomous vehicle 100 may be configured to execute a first operating system when the autonomous vehicle is in an autonomous (or partially autonomous) driving mode and the autonomous vehicle 100 may be configured to execute a second operating system when the autonomous vehicle is not in an autonomous (or partially autonomous) driving mode, other embodiments are within the scope of the present disclosure. For example, in another embodiment one CPU (or other appropriate entity such as a chip, CPU core, and so on) may be executing the first operating system and a second CPU (or other appropriate entity) may be executing the second operating system, where switching between these two modalities is accomplished through fabric switching, as described in greater detail below. Likewise, in some embodiments, processing resources such as a CPU may be partitioned where a first partition supports the execution of the first operating system and a second partition supports the execution of the second operating system.

The guest operating systems 216 may correspond to a particular operating system modality. An operating system modality is a set of parameters or constraints which a given operating system satisfies, and are not satisfied by operating systems of another modality. For example, a given operating system may be considered a "real-time operating system" in that one or more processes executed by the operating system must be performed according to one or more time constraints. The time constraint may not necessarily be in real-time, but instead with the highest or one of the highest priorities so that operations indicated for a real-time modality are executed faster than operations without such a priority. For example, as the automation module 220 must make determinations as to operational commands to facilitate autonomous operation of a vehicle. Accordingly, the automation module 220 must make such determinations within one or more time constraints in order for autonomous operation to be performed in real-time. The automation module 220 may then be executed in an operating system (e.g., a guest operating system 216 of a virtual machine 229) corresponding to a "real-time operating system" modality. Conversely, the data processing module 226 may be able to perform its processing of sensor data independent of any time constraints, and may then be executed in an operating system (e.g., a guest operating system 216 of a virtual machine 229) corresponding to a "non-real-time operating system" modality.

As another example, an operating system (e.g., a guest operating system 216 of a virtual machine 229) may comprise a formally verified operating system. A formally verified operating system is an operating system for which the correctness of each function and operation has been verified with respect to a formal specification according to formal proofs. A formally verified operating system and an unverified operating system (e.g., one that has not been formally verified according to these proofs) can be said to operate in different modalities.

Figure 2:
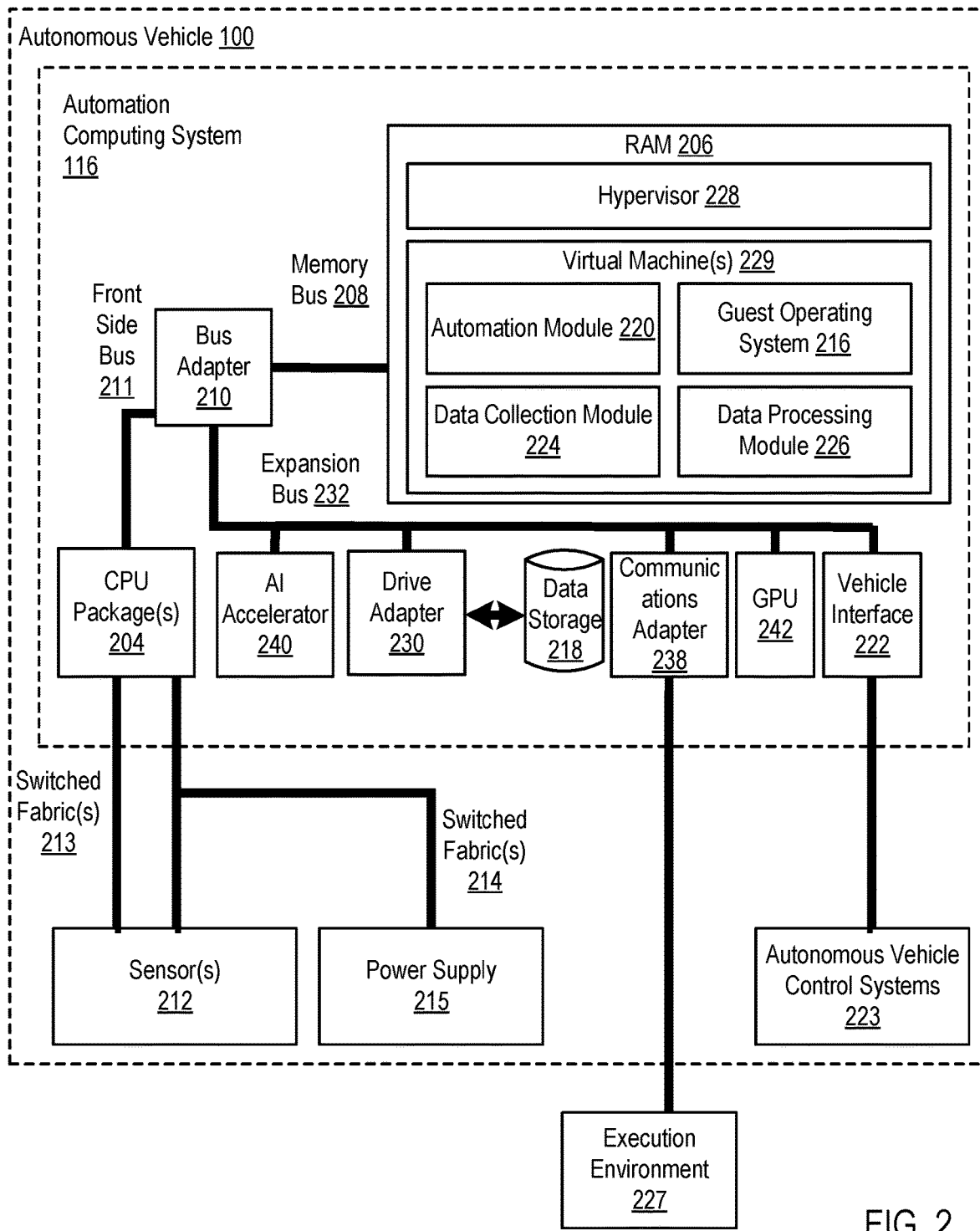
FIG. 2 is a block diagram of an autonomous computing system for dynamic calibration of cameras in a stereoscopic configuration according to some embodiments of the present disclosure.

The automation module 220, data collection module 224, data collection module 224, data processing module 226, hypervisor 228, and virtual machine 229 in the example of FIG. 2 are shown in RAM 206, but many components of such software typically are stored in non-volatile memory also, such as, for example, on data storage 218, such as a disk drive. Moreover, any of the automation module 220, data collection module 224, and data processing module 226 may be executed in a virtual machine 229 and facilitated by a guest operating system 216 of that virtual machine 229.

The automation computing system 116 of FIG. 2 includes disk drive adapter 230 coupled through expansion bus 232 and bus adapter 210 to CPU package(s) 204 and other components of the automation computing system 116. Disk drive adapter 230 connects non-volatile data storage to the automation computing system 116 in the form of data storage 218. Disk drive adapters 230 useful in computers configured for dynamic calibration of cameras in a stereoscopic configuration according to various embodiments include Integrated Drive Electronics ('IDE') adapters, Small Computer System Interface ('SCSI') adapters, and others. Non-volatile computer memory also may be implemented for as an optical disk drive, electrically erasable programmable read-only memory (so-called 'EEPROM' or 'Flash' memory), RAM drives, and so on.

The exemplary automation computing system 116 of FIG. 2 includes a communications adapter 238 for data communications with other computers and for data communications with a data communications network. Such data communications may be carried out serially through RS-238 connections, through external buses such as a Universal Serial Bus ('USB'), through data communications networks such as IP data communications networks, and in other ways. Communications adapters implement the hardware level of data communications through which one computer sends data communications to another computer, directly or through a data communications network. Examples of communications adapters useful in computers configured for dynamic calibration of cameras in a stereoscopic configuration according to specific embodiments include modems for wired dial-up communications, Ethernet (IEEE 802.3) adapters for wired data communications, 802.11 adapters for wireless data communications, as well as mobile adapters (e.g., cellular communications adapters) for mobile data communications. For example, the automation computing system 116 may communicate with one or more remotely disposed execution environments 227 via the communications adapter 238.

The exemplary automation computing system of FIG. 2 also includes one or more Artificial Intelligence (AI) accelerators 240. The AI accelerator 240 provides hardware-based assistance and acceleration of AI-related functions, including machine learning, computer vision, etc. Accordingly, performance of any of the automation module 220, data collection module 224, data processing module 226, or other operations of the automation computing system 116 may be performed at least in part by the AI accelerators 240.

The exemplary automation computing system of FIG. 2 also includes one or more graphics processing units (GPUs) 242. The GPUs 242 are configured to provide additional processing and memory resources for processing image and/or video data, including encoding, decoding, etc. Accordingly, performance of any of the automation module 220, data collection module 224, data processing module 226, or other operations of the automation computing system 116 may be performed at least in part by the GPUs 242.

Figure 3:
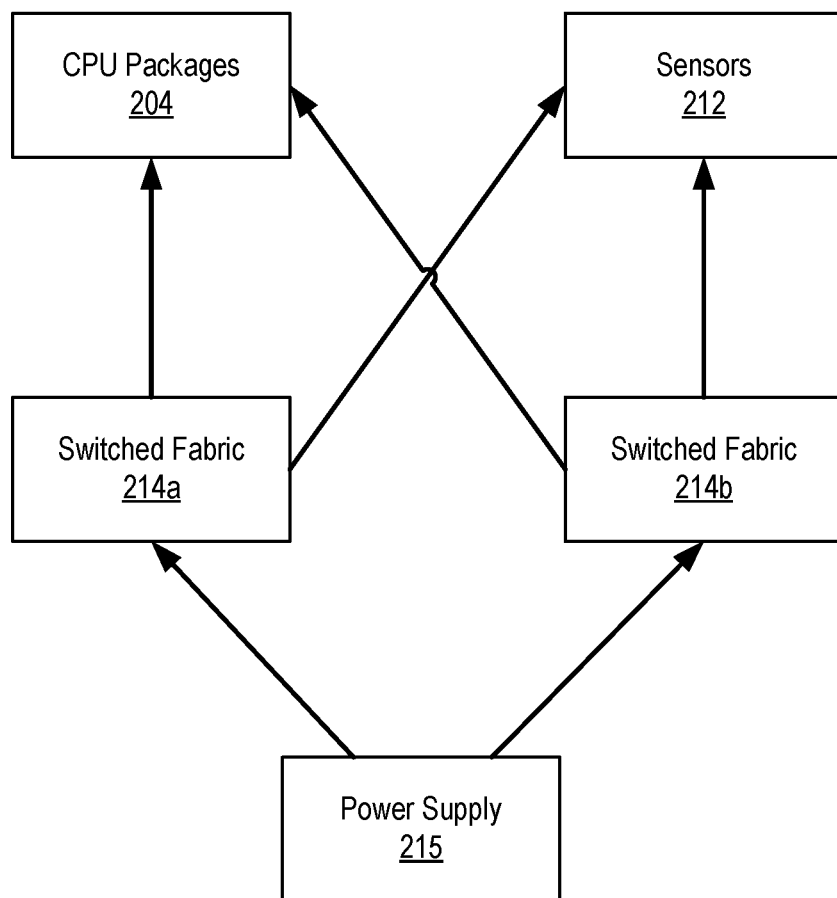
FIG. 3 is a block diagram of a redundant power fabric for dynamic calibration of cameras in a stereoscopic configuration according to some embodiments of the present disclosure.

FIG. 3 shows an example redundant power fabric for dynamic calibration of cameras in a stereoscopic configuration. The redundant power fabric provides redundant pathways for power transfer between the power supplies 215, the sensors 212, and the CPU packages 204. In this example, the power supplies 215 are coupled to the sensors 212 and CPU packages via two switched fabrics 214a and 214b. The topology shown in FIG. 3 provides redundant pathways between the power supplies 215, the sensors 212, and the CPU packages 204 such that power can be rerouted through any of multiple pathways in the event of a failure in an active connection pathway. The switched fabrics 214a and 214b may provide power to the sensors 212 using various connections, including Mobile Industry Processor Interface (MIPI), Inter-Integrated Circuit (I2C), Universal Serial Bus (USB), or another connection. The switched fabrics 214a and 214b may also provide power to the CPU packages 204 using various connections, including Peripheral Component Interconnect Express (PCIe), USB, or other connections. Although only two switched fabrics 214a and 214b are shown connecting the power supplies 215 to the sensors 212 and CPU packages 204, the approach shown by FIG. 3 can be modified to include three, four, five, or more switched fabrics 214.

Figure 4:
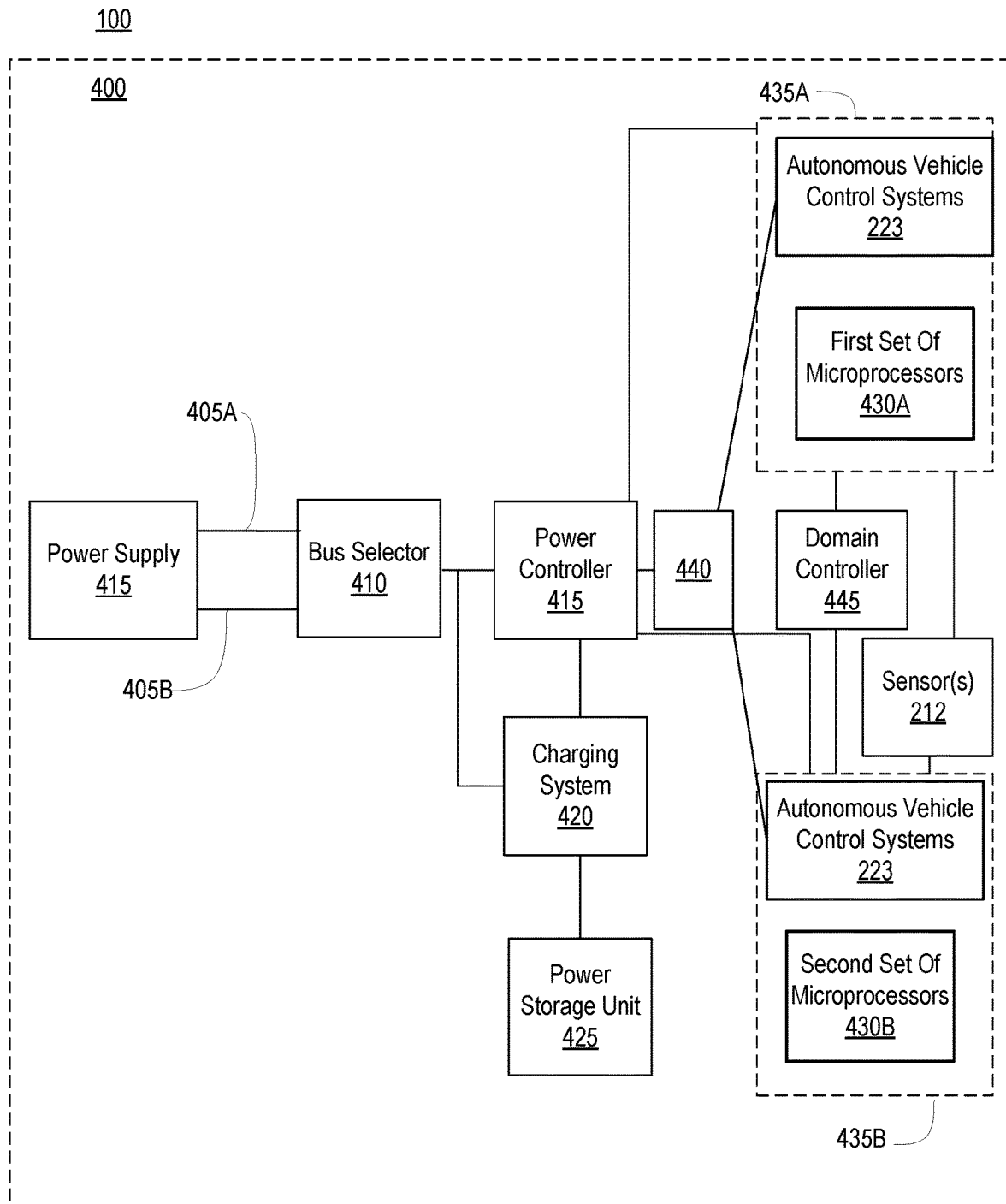
FIG. 4 is an example system for redundantly supplying power to one or more microprocessors of an autonomous vehicle 100 according to some embodiments of the present disclosure.

FIG. 4 is an example system 400 for redundantly supplying power to one or more microprocessors of an autonomous vehicle 100. The system 400 includes a plurality of buses 405A, 405B (also referred to individually and collectively using reference number 405). Each bus 405 is coupled to the power supply 215 and to a bus selector 410. Further, each bus 405 of the plurality of buses 405 is independent of other buses 405 of the plurality of buses 405. While FIG. 4 shows an embodiment with two buses 405A, 405B, in other embodiments, different numbers of buses 405 are included in the system 400. For example, various embodiments include three buses 405, four buses 405, five buses 405, or any other number of buses 405.

The bus selector 410 selects one of the plurality of buses 405 as an output of the bus selector 410. The bus selector 410 is one or more integrated circuits or other logic circuits that selects one of the buses 405A, 405B as an output based on characteristics of voltage or current detected along bus 405A and bus 405B. For example, the bus selector 410 selects bus 405A as output in response to the bus selector 410 detecting a higher voltage on bus 405A than on bus 405B. Similarly, the bus selector 410 selects bus 405B as output in response to the bus selector 410 detecting a higher voltage on bus 405B than on bus 405A. In various embodiments, the bus selector 410 selects whichever bus 405 coupled to the bus selector 410 having a highest voltage as the output of the bus selector 410.

The output of the bus selector 410 is coupled to a power controller 415, which is also coupled to a power storage unit 425. In some embodiments, the output of the bus selector 410 is coupled to the power storage unit 425. The power controller 415 is a microcontroller, processor, logical circuit, field-programmable gate array (FPGA), or other structure configured to select a power output as one of the outputs of the bus selector 410 or the power storage unit 425. However, in some embodiments, such as the embodiment shown in FIG. 4, the output of the bus selector 410 is coupled to a charging system 420, with the charging system 420 coupled to the power storage unit 425. In some embodiments, the power controller 415 is coupled to the charging system 420, with the charging system 420 coupled to the power storage unit 425. However, in other embodiments, the power controller 415 is directly coupled to the power storage unit 425, and the output of the bus selector 410 is coupled to the charging system 420.

The power controller 415 selects the power output based on the output of the bus selector 410. The power output of the power controller 415 is coupled to at least one of a first power domain 435A or a second power domain 435B, with the first power domain 435A including a first set of microprocessors 430A and the second power domain 435B including a second set of microprocessors 430B. While FIG. 4 shows an example including two power domains, in other embodiments, additional power domains are coupled to the power controller 415 to increase redundancy. The power output selected by the power controller 415 is directed to at least one of the first power domain 435A or the second power domain 435B. In various embodiments, the power output is directed to a single power domain 435, with other power domains 435 not receiving power. In other embodiments, power is provided to a power domain 435A through the power output, with a portion of the power output sufficient for one or more microprocessors in the power domain 435B to operate in a standby mode directed to the power domain 435B.

In various embodiments, the power controller 415 selects the power output based on a voltage of the output of the bus selector 410. For example, the power controller 415 selects the power output as the output of the bus selector 410 in response to determining the voltage of the output of the bus selector 410 is at least a threshold voltage. In the preceding example, the power controller 415 selects the power output as an output of the power storage unit 425 in response to determining the voltage of the output of the bus selector 410 is less than the threshold voltage. For example, the threshold voltage is a voltage sufficient to operate at least one of the first power domain 435A or the second power domain 435B. In some embodiments, the threshold voltage is specified as a voltage sufficient to operate the first set of microprocessors 430A or the second set of microprocessors 430B for at least a threshold amount of time. The threshold voltage is stored in a memory of the power controller 415 in various embodiments, allowing different systems 400 to specify different threshold voltages for selecting the power output of the power controller 415.

In various embodiments, the threshold voltage stored by the power storage unit 425 is sufficient to power the first power domain 435A or the second power domain 435B for a threshold amount of time for the autonomous vehicle 100 to complete a minimal risk condition. As used herein, a "minimal risk condition" specifies one or more actions for the autonomous vehicle 100 to complete while an autonomous mode to allow a driver to resume manual control of the autonomous vehicle 100 or for the autonomous vehicle 100 to safely come to a stop while in the autonomous mode. In some embodiments, the minimal risk condition specifies the autonomous vehicle 100 moving to an emergency lane or otherwise out of a lane including moving traffic and stopped. In other embodiments, the minimal risk condition specifies the autonomous vehicle 100 travels an off ramp and comes to a stop. As another example, a minimal risk condition specifies the autonomous vehicle 100 enters a lane for traffic moving at a slower speed. In another example, a minimal risk condition specifies the autonomous vehicle 100 perform autonomous control operations for a threshold amount of time to allow a driver to resume manual control of the autonomous vehicle 100. For another example, the minimal risk condition specifies the autonomous vehicle 100 come to a stop in a lane where the autonomous vehicle 100 Is currently travelling. In other embodiments, the minimal risk condition specifies multiple actions for the autonomous vehicle to complete 100. For example, a minimal risk condition specifies the autonomous vehicle 100 complete a maneuver in progress, move to a different lane than a current lane, identify a location out of a flow of traffic (e.g., on a side of a road), come to a stop in the identified location, park, and turn on hazard lights. In different embodiments, different combinations of actions or actions are specified as the minimal risk condition; for example, different autonomous vehicles 100 store information identifying different vehicle-specific minimal risk conditions. Both the first power domain 435A and the second power domain 435B are capable of providing instructions for completing the minimal risk condition.

The charging system 420 provides power from the output of the bus selector 410 to the power storage unit 425. This causes the output of the bus selector 410 to charge the power storage unit 425, allowing the power storage unit 425 to store power from the power supply 401 received via the output of the bus selector 410. In some embodiments, the charging system 420 obtains charging information from the power storage unit 425 and adjusts charging of the power storage unit 425 accordingly. For example, the charging system 420 obtains a current voltage from the power storage unit 425 and determines whether a current voltage of the power storage unit 425 is less than a threshold voltage.

The power storage unit 425 is a device configured to store power. Examples of the power storage unit 425 include a battery or a capacitor. In various embodiments, the power storage unit 425 is configured to store a minimum voltage for operating at least one of the first set of microprocessors 430A or the second set of microprocessors 430B. For example, the power storage unit 425 is configured to store a voltage capable of operating at least one of the first set of microprocessors 430A or the second set of microprocessors 430B for at least a threshold amount of time. The power storage unit 425 receives power from the output of the bus selector 410, so the power storage unit 425 accumulates power received from output of the bus selector 410. This allows the power storage unit 425 to act as an alternative power source that is charged while at least one of the buses 405 is supplying power as the output of the bus selector 410 and is used when the output of the bus selector 410 satisfies one or more criteria (e.g., when the output of the bus selector 410 has less than a threshold voltage). In different embodiments, the power storage unit 425 has different power storage capacities or charges at different rates. While FIG. 4 shows a single power storage unit 425 for purposes of illustration, in other embodiments, the system 400 includes multiple power storage units 425 coupled to the output of the bus selector 410 and to the power controller 415.

In the embodiment shown in FIG. 4, the power output of the power controller is coupled to a control bus 440 that comprises connections between the power controller 415 and each of at least a collection of autonomous vehicle control systems 223 to route power from the power storage unit 425 to at least the collection of autonomous vehicle control systems 223. Inclusion of the control bus 440 simplifies routing of power from the power storage unit 425 to different autonomous vehicle control systems 223. In some embodiments, the threshold amount of power stored by the power storage unit 425 is sufficient to operate the collection of autonomous vehicle control systems 223 and one of the first set of microprocessors 430A or the second set of microprocessors 430B for a sufficient amount of time for the autonomous vehicle 100 to complete a minimum risk condition. The collection of autonomous vehicle control systems 223 includes an automation module 220 capable of completing a minimal risk condition and includes one or more autonomous vehicle control systems 223 capable of modifying movement of the autonomous vehicle 100. For example, the collection of systems 223 includes a braking system and a steering system. One or more lighting systems may be included in the collection of autonomous vehicle control systems 223 in various implementations. The collection of autonomous vehicle control systems 223 excludes one or more autonomous vehicle control systems, such as an entertainment system or a heating and air conditioning control system, in various embodiments.

A domain controller 445 is coupled to the first power domain 435A and to the second power domain 435B. The domain controller 445 includes switching logic that redirects power from the power output of the power controller 415 to the first power domain 435A or to the second power domain 435B based on one or more conditions. For example, the domain controller 445 routes power that the first power domain 435A receives from the power output of the power controller 415 to the second power domain 435B in response to one or more microprocessors in the first power domain 435A providing less than a threshold amount of functionality. In various embodiments, the domain controller 445 monitors the first power domain 435A and the second power domain 435B and determines whether the first power domain 435A or the second power domain 435B is capable of providing instructions for the autonomous vehicle to complete a minimal risk condition using at least the collection of the autonomous vehicle control systems 223 that control movement of the autonomous vehicle 100 while the autonomous vehicle 100 is in an autonomous mode based on instructions provided by the first set of microprocessors 430A or by the second set of microprocessors 430B. In response to determining the first power domain 435A is not capable of providing instructions to at least the collection of autonomous vehicle control systems 223 to complete the minimal risk condition, the domain controller 445 routes power from the first power domain 435A to the second power domain 435B. Similarly, in response to determining the second power domain 435B is not capable of providing instructions to at least the collection of autonomous vehicle control systems 223 to complete the minimal risk condition, the domain controller 445 routes power from the second power domain 435B to the first power domain 435A. The domain controller 445 allows the power output of the power controller 415 to be routed to a power domain 435 capable of completing a minimal risk condition, providing redundancy for the autonomous vehicle completing a minimal risk condition while in an autonomous mode. This allows the domain controller 445 to direct the power output to a power domain 435 capable of executing functionality for completing a minimal risk condition, providing additional safety for a driver of the autonomous vehicle 100.

Figure 5:
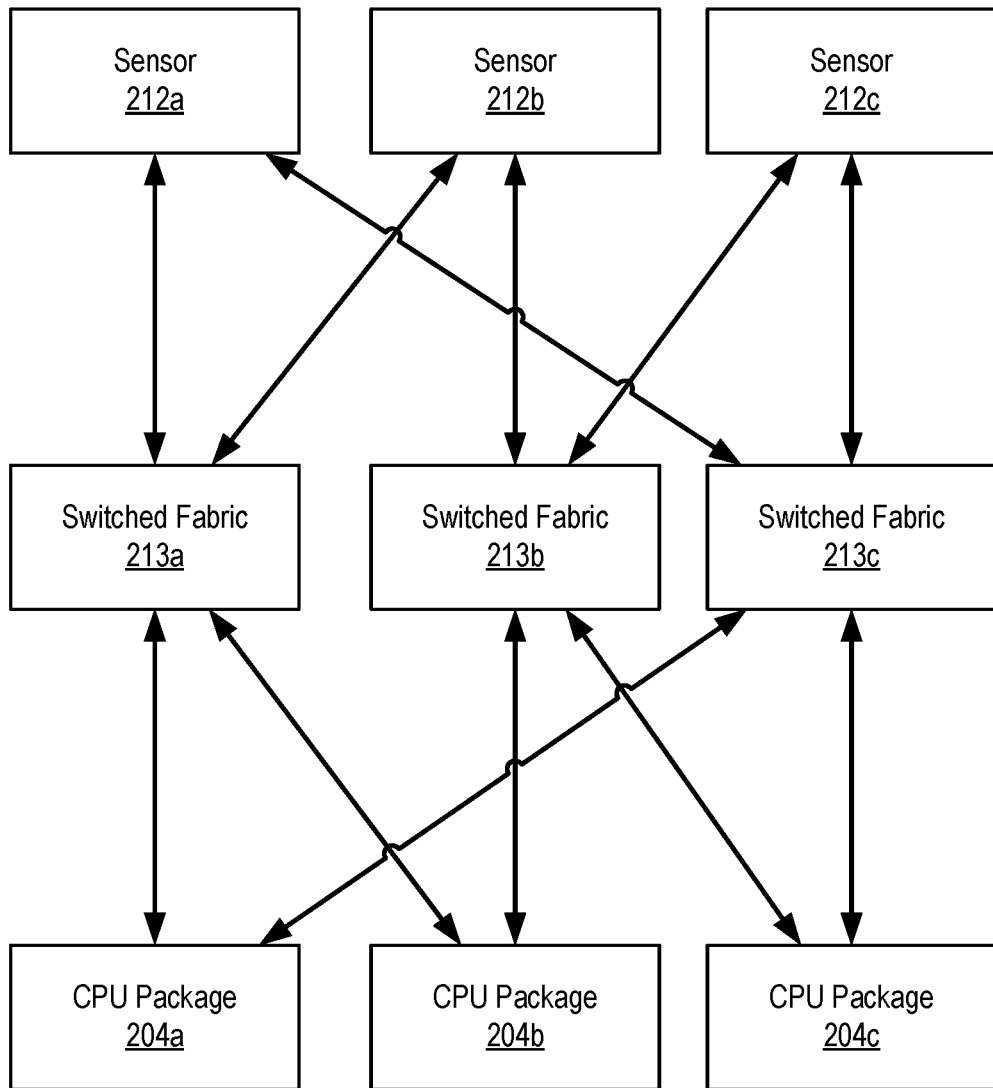
FIG. 5 is a block diagram of a redundant data fabric for dynamic calibration of cameras in a stereoscopic configuration according to some embodiments of the present disclosure.

FIG. 5 is an example redundant data fabric for dynamic calibration of cameras in a stereoscopic configuration. The redundant data fabric provides redundant data connection pathways between sensors 212 and CPU packages 204. In this example view, three CPU packages 204a, 204b, and 204c are connected to three sensors 212a, 212b, and 212c via three switched fabrics 213a, 213b, and 213c. Each CPU package 204a, 204b, and 204c is connected to a subset of the switched fabrics 213a, 213b, and 213c. For example, CPU package 204a is connected to switched fabrics 213a and 213c, CPU package 204b is connected to switched fabrics 213a and 213b, and CPU package 204c is connected to switched fabrics 213b and 213c. Each switched fabric 213a, 213b, and 213c is connected to a subset of the sensors 212a, 212b, and 212c. For example, switched fabric 213a is connected to sensors 212a and 212b, switched fabric 213b is connected to sensor 212b and 212c, and switched fabric 213c is connected to sensors 212a and 212c. Under this topology, each CPU package 204a, 204b, and 204c has an available connection path to any sensor 212a, 212b, and 212c. It is understood that the topology of FIG. 5 is exemplary, and that CPU packages, switched fabrics, sensors, or connections between components may be added or removed while maintaining redundancy.

FIG. 6 is an example view of process allocation across CPU packages for dynamic calibration of cameras in a stereoscopic configuration. Shown are three CPU packages 204a, 204b, and 204c. Each CPU package 204a includes a processing unit that has been allocated (e.g., by a hypervisor 228 or other process or service) primary execution of a process and another processing unit that has been allocated secondary execution of a process. As set forth herein, primary execution of a process describes an executing instance of a process whose output will be provided to another process or service. Secondary execution of the process describes executing an instance of the process in parallel to the primary execution, but the output may not be output to the other process or service. For example, in CPU package 204a, processing unit 602a has been allocated secondary execution of "process B," denoted as secondary process B 604b, while processing unit 602b has been allocated primary execution of "process C," denoted as primary process C 606a.

CPU package 204a also comprises two redundant processing units that are not actively executing a process A, B, or C, but are instead reserved in case of failure of an active processing unit. Redundant processing unit 608a has been reserved as "A/B redundant," indicating that reserved processing unit 608a may be allocated primary or secondary execution of processes A or B in the event of a failure of a processing unit allocated the primary or secondary execution of these processes. Redundant processing unit 608b has been reserved as "A/C redundant," indicating that reserved processing unit 608b may be allocated primary or secondary execution of processes A or C in the event of a failure of a processing unit allocated the primary or secondary execution of these processes.

CPU package 204b includes processing unit 602c, which has been allocated primary execution of "process A," denoted as primary process A 610a, and processing unit 602d, which has been allocated secondary execution of "process C," denoted as secondary process C 606a. CPU package 204b also includes redundant processing unit 608c, reserved as "A/B redundant," and redundant processing unit 608d, reserved as "B/C redundant." CPU package 204c includes processing unit 602e, which has been allocated primary execution of "process B," denoted as primary process B 604a, and processing unit 602f, which has been allocated secondary execution of "process A," denoted as secondary process A 610b. CPU package 204c also includes redundant processing unit 608e, reserved as "B/C redundant," and redundant processing unit 608f, reserved as "A/C redundant."

As set forth in the example view of FIG. 6, primary and secondary instances processes A, B, and C are each executed in an allocated processing unit. Thus, if a processing unit performing primary execution of a given process fails, the processing unit performing secondary execution may instead provide output of the given process to a receiving process or service. Moreover, the primary and secondary execution of a given process are executed on different CPU packages. Thus, if an entire processing unit fails, execution of each of the processes can continue using one or more processing units handling secondary execution. The redundant processing units 608a-f allow for allocation of primary or secondary execution of a process in the event of processing unit failure. This further prevents errors caused by processing unit failure as parallel primary and secondary execution of a process may be restored. The number of CPU packages, processing units, redundant processing units, and processes may be modified according to performance requirements while maintaining redundancy.

Figure 7:
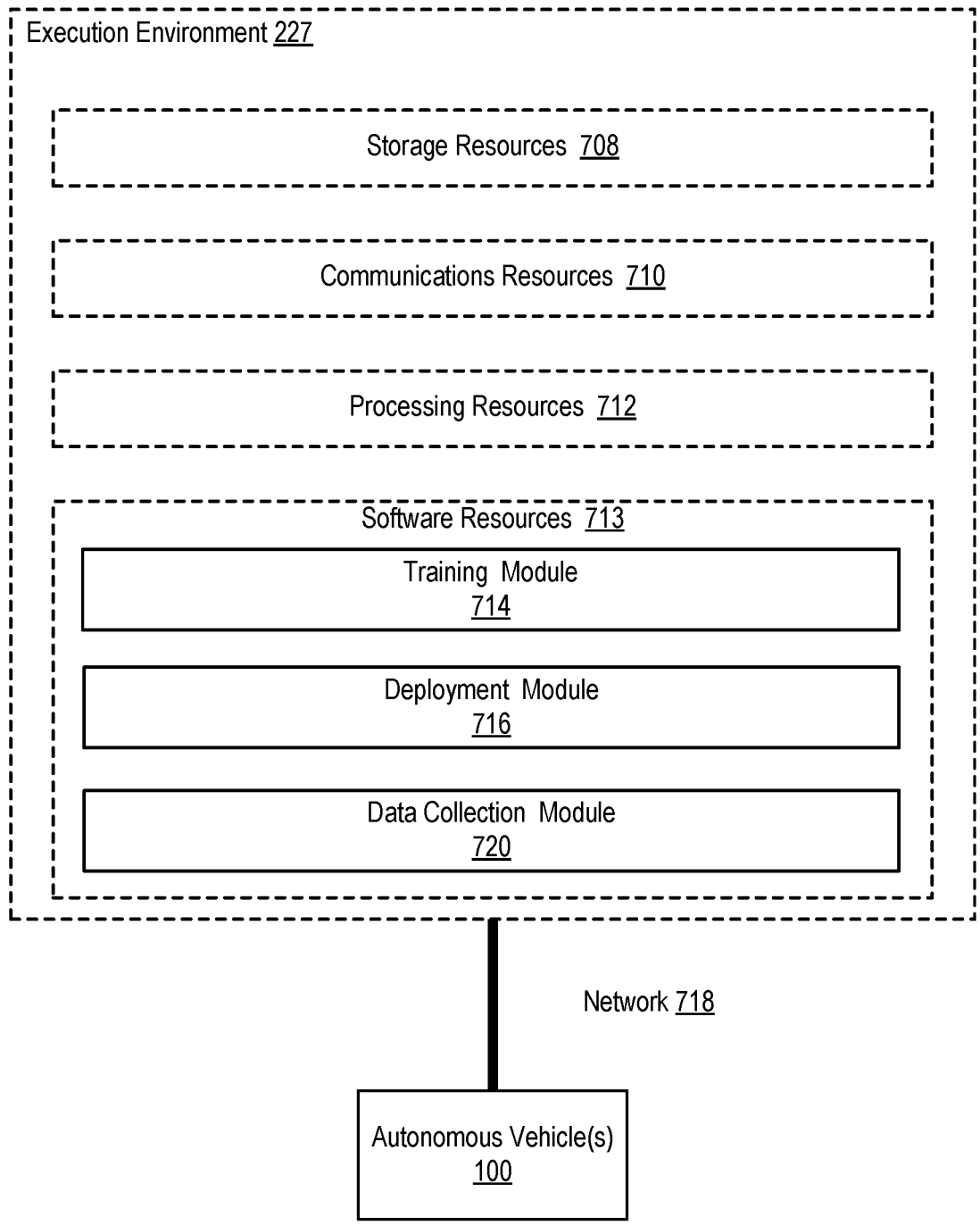
FIG. 7 is an example view of an execution environment for dynamic calibration of cameras in a stereoscopic configuration according to some embodiments of the present disclosure.

For further explanation, FIG. 7 sets forth a diagram of an execution environment 227 in accordance with some embodiments of the present disclosure. The execution environment 227 depicted in FIG. 7 may be embodied in a variety of different ways. The execution environment 227 may be provided, for example, by one or more physical or virtual machine components consisting of bare-metal applications, operating systems such as Android, Linux, Real-time Operating systems (RTOS), Automotive RTOS, such as AutoSAR, and others, including combinations thereof. The execution environment 227 may also be provided by cloud computing providers such as Amazon AWS™, Microsoft Azure™, Google Cloud™, and others, including combinations thereof. Alternatively, the execution environment 227 may be embodied as a collection of devices (e.g., servers, storage devices, networking devices) and software resources that are included in a computer or distributed computer or private data center. The execution environment 227 may be constructed in a variety of other ways and may even include resources within one or more autonomous vehicles or resources that communicate with one or more autonomous vehicles.

The execution environment 227 depicted in FIG. 7 may include storage resources 708, which may be embodied in many forms. For example, the storage resources 708 may include flash memory, hard disk drives, nano-RAM, 3D crosspoint non-volatile memory, MRAM, non-volatile phase-change memory (PCM), storage class memory (SCM), or many others, including combinations of the storage technologies described above. Other forms of computer memories and storage devices may be utilized as part of the execution environment 227, including DRAM, SRAM, EEPROM, universal memory, and many others. The storage resources 708 may also be embodied, in embodiments where the execution environment 227 includes resources offered by a cloud provider, as cloud storage resources such as Amazon Elastic Block Storage (EBS) block storage, Amazon S3 object storage, Amazon Elastic File System (EFS) file storage, Azure Blob Storage, and many others. The example execution environment 227 depicted in FIG. 7 may implement a variety of storage architectures, such as block storage where data is stored in blocks, and each block essentially acts as an individual hard drive, object storage where data is managed as objects, or file storage in which data is stored in a hierarchical structure. Such data may be saved in files and folders, and presented to both the system storing it and the system retrieving it in the same format.

The execution environment 227 depicted in FIG. 7 also includes communications resources 710 that may be useful in facilitating data communications between components within the execution environment 227, as well as data communications between the execution environment 227 and computing devices that are outside of the execution environment 227. Such communications resources may be embodied, for example, as one or more routers, network switches, communications adapters, and many others, including combinations of such devices. The communications resources 710 may be configured to utilize a variety of different protocols and data communication fabrics to facilitate data communications. For example, the communications resources 710 may utilize Internet Protocol ('IP') based technologies, fibre channel (FC) technologies, FC over ethernet (FCOE) technologies, InfiniBand (IB) technologies, NVM Express (NVMe) technologies and NVMe over fabrics (NVMeoF) technologies, and many others. The communications resources 710 may also be embodied, in embodiments where the execution environment 227 includes resources offered by a cloud provider, as networking tools and resources that enable secure connections to the cloud as well as tools and resources (e.g., network interfaces, routing tables, gateways) to configure networking resources in a virtual private cloud. Such communications resources may be useful in facilitating data communications between components within the execution environment 227, as well as data communications between the execution environment 227 and computing devices that are outside of the execution environment 227 (e.g., computing devices that are included within an autonomous vehicle).

The execution environment 227 depicted in FIG. 7 also includes processing resources 712 that may be useful in useful in executing computer program instructions and performing other computational tasks within the execution environment 227. The processing resources 712 may include one or more application-specific integrated circuits (ASICs) that are customized for some particular purpose, one or more central processing units (CPUs), one or more digital signal processors (DSPs), one or more field-programmable gate arrays (FPGAs), one or more systems on a chip (SoCs), or other form of processing resources 712. The processing resources 712 may also be embodied, in embodiments where the execution environment 227 includes resources offered by a cloud provider, as cloud computing resources such as one or more Amazon Elastic Compute Cloud (EC2) instances, event-driven compute resources such as AWS Lambdas, Azure Virtual Machines, or many others.

The execution environment 227 depicted in FIG. 7 also includes software resources 713 that, when executed by processing resources 712 within the execution environment 227, may perform various tasks. The software resources 713 may include, for example, one or more modules of computer program instructions that when executed by processing resources 712 within the execution environment 227 are useful in training neural networks configured to determine control autonomous vehicle control operations. For example, a training module 714 may train a neural network using training data including sensor 212 data and control operations recorded or captured contemporaneous to the training data. In other words, the neural network may be trained to encode a relationship between an environment relative to an autonomous vehicle 100 as indicated in sensor 212 data and the corresponding control operations effected by a user or operation of the autonomous vehicle. The training module 714 may provide a corpus of training data, or a selected subset of training data, to train the neural network. For example, the training module 714 may select particular subsets of training data associated with particular driving conditions, environment states, etc. to train the neural network.

The software resources 713 may include, for example, one or more modules of computer program instructions that when executed by processing resources 712 within the execution environment 227 are useful in deploying software resources or other data to autonomous vehicles 100 via a network 718. For example, a deployment module 716 may provide software updates, neural network updates, or other data to autonomous vehicles 100 to facilitate autonomous vehicle control operations.

The software resources 713 may include, for example, one or more modules of computer program instructions that when executed by processing resources 712 within the execution environment 227 are useful in collecting data from autonomous vehicles 100 via a network 718. For example, a data collection module 720 may receive, from autonomous vehicles 100, collected sensor 212, associated control operations, software performance logs, or other data.

Such data may facilitate training of neural networks via the training module 714 or stored using storage resources 708.

For further explanation, FIG. 8 sets forth a flow chart illustrating an exemplary method for a dynamic camera calibration system according to some embodiments of the present disclosure. In some embodiments, the method of FIG. 8 may be implemented in an autonomous vehicle such as an autonomous vehicle 100 as is set forth above. In some embodiments, the method of FIG. 8 may be implemented in another system that includes cameras in a stereoscopic configuration and another sensor other than the first camera and the second camera.

The method of FIG. 8 includes determining 802 a disparity between first image data from a first camera and second image data from a second camera, wherein the first camera and the second camera are in a stereoscopic configuration. Autonomous vehicles such as those described herein, as well as other autonomous devices such as drones, robots, and the like, may use stereoscopic vision to perceive the surrounding environment. For example, the use of stereoscopic vision may allow for estimating the distance, speed, or other motion-related attributes of objects in the environment. Stereoscopic vision requires the use of at least two camera sensors facing the same or similar directions (e.g., capturing substantially overlapping images, sharing a substantially same field of view). The first image data and the second image data may be embodied as images that are captured by the first camera and second camera at substantially the same time. For example, the first image data and the second image data may correspond to a same interval for capturing image data by the first camera and the second camera. In some embodiments, the first image data and the second image data may be captured within some threshold time distance apart defined according to some fault tolerance for processing stereoscopic image data. For example, images from separate stereoscopic cameras may be captured within some fault tolerance window whereby the separate images may be processed as occurring at substantially the same time.

A disparity between the first image data and the second image data may be, for example, a difference or shift in where an object appears in the first image data relative to where the object appears in the second image data. Particularly, the disparity may be expressed as a difference or shift of where an object appears in the first image data and the second image data relative to the X-axis. In other words, the disparity may not reflect any shift or difference in placement of the object relative to the Y-axis.

As an example, if an object is positioned relatively far from the first camera and the second camera, the object should have little-to-no disparity between the first image data and the second image data. In other words, the object will appear in relatively similar locations in the first image data and the second image data at greater distances. As the object approaches the first camera and the second camera, the disparity may increase as the object can appear in increasingly diverging locations between the first image data and the second image data. This is similar to the functionality of human eyes where objects at a distance will appear in similar relative locations when using one eye or the other, while closer objects will appear in different relative locations when using one eye or the other. Accordingly, the approaches set forth herein describe approaches for calibrating stereoscopic cameras with respect to the X-axis, as a disparity with respect to the X-axis may be due to the relative distance of the object or to some miscalibration or misalignment of the cameras due to a physical movement of one or more of the cameras. In contrast, disparity with respect to the Y-axis may be compensated for when processing image data by shifting one or more images of the image data such that they are aligned in the Y-axis.

In some embodiments, determining 802 the disparity may include providing, to one or more models, the first image data and the second image data. For example, the one or more models may be trained or configured to compare the first image data and the second image data as a whole to identify the disparity, whereby the entire scene of the first image data and the second image data is used to identify the disparity. In some embodiments, the one or more models may be trained or configured to identify one or more objects in the first image data and the second image data and calculate the disparity based on the relative positionings of the one or more objects in the first image data and the second image data.

Although a disparity may be present due to the distance of an object relative to the first camera and the second camera, a disparity may also be present or affected due to a shift in the positioning of the first camera or the second camera. For example, the angle or direction of the first camera or the second camera, or a distance between the first camera and the second camera, may change due to external forces exerted on the first camera or the second camera. Continuing with the example of stereoscopic cameras in an autonomous vehicle, vibrations due to road conditions or due to collisions with an object may cause the first camera or the second camera to move in their housing or mount, thereby changing an angle of the first camera or the second camera or changing a distance between the first camera and the second camera. Accordingly, the subsequently captured image data may have a greater or lesser disparity than would otherwise be present if only distance to the object were the only factor creating the disparity. Other reasons that may cause the first or second cameras to move include: the miscalibration or misalignment may be as a result of a variety of reasons, such as erroneous initial calibration, manufacturing defects, weakening of epoxies or other methods used to secure the cameras, expansion or contracting of materials due to time or temperature, or other reasons.

The method of FIG. 8 also includes adjusting 804 the first camera or the second camera based on the disparity and also based on sensor data from a sensor other than the first camera and the second camera. Such an adjustment may be made to calibrate the stereoscopic configuration of the first camera and the second camera to achieve accurate stereoscopic camera distance functionality. As is set forth above, a disparity in where a particular object appears in image data in the first camera and second camera may be due to the distance of the object relative to the cameras. In other words, disparity may increase as an object moves closer to the cameras while disparity may decrease as the object moves further away from the cameras. Accordingly, the disparity may be used in calculating the distance of the object (e.g., relative to the cameras, relative to an ego vehicle implementing the cameras). For example, a linear regression or other function may be used to calculate the distance of an object based on the disparity, the focal lengths of the cameras, data describing a relative positioning of the cameras as described in further detail below, or other data. As movement of the first camera or the second camera may affect the perceived disparity, such movement may affect a distance calculation for objects in the first image data and the second image data (e.g., the stereoscopic camera distance functionality). For example, an object having an increased disparity due to movement of the first or second camera may be calculated as being closer than where the object is actually located. As another example, an object having a reduced disparity due to movement of the first or second camera may be calculated as being further than where the object is actually located. Such miscalculated distances may affect autonomous driving functionality including how autonomous driving decisions are determined during an autonomous driving mode. For example, where an object is calculated as being closer than it is actually located, the autonomous vehicle may perform maneuvers to avoid collision with the object where it may not be necessary. As another example, where an object is calculated as being further away than it is actually located, the autonomous vehicle may not detect where collision with the object is imminent and may not take necessary maneuvers to avoid collision.

Accordingly, one or more of the first camera and the second camera may be adjusted 804 to accommodate for disparities introduced by movement of the first or second camera, thereby calibrating the stereoscopic camera configuration to achieve accurate stereoscopic camera distance functionality. As described herein, adjusting 804 one or more of the first camera or the second camera includes adjusting how image data from the first camera or the second camera is generated or processed rather than adjusting the physical placement or physical configuration of the cameras themselves.

As is set forth above, adjusting 804 one or more of the first camera or the second camera is based on, in addition to the disparity, sensor data from another sensor. The other sensor includes a non-camera sensor capable of detecting distances to objects. In some embodiments, the other sensor includes a sensor that operates independently of the first camera and the second camera such that their respective sensor and image data are captured independent of each other. For example, the other sensor may be an independent method of calculating distance to objects in the same direction as the cameras. In some embodiments, the other sensor may be housed in a different sensor housing or at a different location than the first camera and the second camera. In some embodiments, the other sensor may include a distance sensor. In some embodiments, the other sensor may include a sensor that generates emissions in a particular spectrum and then detects return emissions, such as radar or LiDAR. This is in contrast to the first and second camera that are passive receivers of color information without necessarily emitting light themselves.

In some embodiments, the other sensor includes a sensor operating in a non-visual spectrum. In other words, the sensor perceives the environment (e.g., external to the autonomous vehicle or other systems implementing cameras in a stereoscopic configuration) by sensing in a non-visual spectrum, thereby detecting objects within range of the sensor using the non-visual spectrum. In some embodiments, the other sensor may include a radar sensor. The sensor data may therefore include radar data capturing the external environment. In some embodiments, the sensor may include another non-camera sensor operating in the visual spectrum (e.g., approximately 740 nm to 380 nm). The other sensor may therefore include a visual spectrum sensor that emits light in one or more spectrums, such as a LiDAR sensor that may emit light at approximately 532 nm. Accordingly, in such embodiments the sensor data may include LiDAR data capturing the external environment.

In some embodiments, adjusting 804 one or more of the first camera or the second camera may include adjusting 804 one or more of the first camera or the second camera based on a difference between a distance of an object calculated as a function of the disparity (e.g., using stereoscopic camera distance functionality) and a distance of the object as detected in the sensor data. For example, where an object is calculated based on the disparity to be at a distance M and the sensor detects the object at distance N, the first and second cameras should be adjusted 804 (e.g., recalibrated) to account for the difference between M and N. In other words, the first and second cameras should be recalibrated such that, in subsequent distance calculations, M and N are equal or near equal.

Continuing with this example, assume that a radar sensor detects an object at fifty meters and that the distance based on the disparity is seventy-five meters, resulting in a difference of twenty-five meters. This distance-based difference may be converted into a pixel offset reflecting the degree to which the disparity is incorrect. For example, assuming a twenty-five-meter difference, this may convert to a specific offset in number of pixels (e.g., three pixels). Such a conversion may be performed, for example, using a linear regression or other function based on the difference, the calculated distances of the object (e.g., using each of the disparity and the sensor), data describing various configuration or operational parameters of the cameras including focal length, and other data as can be appreciated. In some embodiments, as will be described below, the difference in distance, the pixel offset, and/or the calculated distances may be used to calculate the relative positioning of the first camera and the second camera using trigonometry or other approaches.

In some embodiments, the other sensor may be located or housed in a different location on the vehicle than the first and second cameras such that a distance to a given object may be different relative to the other sensor and the first and second cameras. For example, assuming a first and second camera mounted on the front windshield and another sensor (e.g., a radar sensor) mounted half a meter behind the first and second camera, distances to objects directly ahead of the vehicle may be measured as being half a meter greater by the first and second camera (when properly calibrated) than by the radar sensor. Accordingly, in some embodiments, this offset between placement locations of the first and second camera and the radar sensor may be used in adjusting 804 one or more of the first camera or the second camera based on a difference between a distance of an object calculated as a function of the disparity and a distance of the object as detected in the sensor data, such as to scale the difference. In some embodiments, a mounting angle or height of the other sensor relative to the first and second camera, an angle or lateral positioning of the object relative to the other sensor and first and second cameras, or other factors may also be used in scaling or otherwise modifying the calculated distance.

In some embodiments, adjusting 804 one or more of the first camera or the second camera may include adjusting 804 one or more of the first camera or the second camera based on the disparity in response to no object being detected in the sensor data (e.g., where no object is detected within range of the sensor). Where no object is detected within range of the sensor, any objects captured in the image data (e.g., trees, hills, buildings, clouds, the horizon, the sun, an infinite vanishing point) should be at a sufficient distance such that the disparity should be zero. Accordingly, any detected disparity is likely the result of movement of one or more of the cameras themselves. The disparity itself may then be used as a pixel offset as described above for adjusting 804 one or more of the first camera or the second camera. In other words, the first or second camera may be adjusted 804 using the disparity and independent of objects detected in the sensor data, as no such objects are detected.

Adjusting 804 one or more of the first camera or the second camera to calibrate the stereoscopic configuration of the cameras may be performed using a variety of approaches. In some embodiments, adjusting 804 one or more of the first camera or the second camera may include modifying 806, based on the disparity and the sensor data, data describing a relative positioning of the first camera and the second camera. The relative positioning of the cameras includes a relative placement and/or orientation of the first and second cameras relative to each other. For example, in some embodiments, the data describing the relative position of the first camera and the second camera may indicate one or more angles (e.g., of the X-axis, of the X- and Y-axis) between the direction of the first camera and the direction of the second camera. In some embodiments, the data describing the relative position of the first camera and the second camera may indicate a distance between the first camera and the second camera (e.g., relative to some reference point in each of the first camera and the second camera). In some embodiments, the data may be stored as part of a configuration file for the first camera and/or the second camera. Such a configuration file may be stored, for example, in the first camera and/or the second camera, in an image signal processor (ISP) or in memory accessible to the ISP, or in one or more other storage locations as can be appreciated.

The data describing the relative positioning of the first camera and the second camera may be used, for example, in calculating the distance to objects captured in image data from the first camera and the second camera. For example, information such as the distance between the first camera and the second camera and/or the relative angle of the first camera and the second camera may be used as input to one or more models or one or more functions used to calculate the distance to objects captured in the image data. Accordingly, modifying 806 this data would affect subsequent distance calculations.

In some embodiments, modifying 806 the data may be performed based on the disparity in response to no objects being identified in the sensor data, as described above. For example, assuming a three-pixel disparity where no disparity should be present, the data may be modified to increase or decrease a stored indication of an angle between the cameras or modified to increase or decrease a stored indication of a distance between the cameras. In some embodiments, whether such stored indications are increased or decreased may be dependent on the direction of the disparity (e.g., whether an object appears further apart or closer between the first image data and the second image data).

In some embodiments, modifying 806 the data may be based on a difference between a distance of an object calculated as a function of the disparity and a distance of the object as detected in the sensor data, as described above. For example, the data describing the relative positioning of the cameras may be modified to reflect the correct angles and/or distances between the first camera and the second camera based on the distance calculated using the sensor or the difference between the calculated distances using trigonometry or another approach.

The data describing the relative positioning of the cameras may be used in calculating distances of objects using stereoscopic image data from the first camera and the second camera. Accordingly, by modifying the data to reflect correct angles and/or distances between stereoscopic cameras, subsequently calculated distances will be more accurate, thereby calibrating the stereoscopic configuration to achieve stereoscopic distance functionality.

In some embodiments, adjusting 804 one or more of the first camera or the second camera may include providing 808, based on the disparity and the sensor data, a command to crop image data from one or more of the first camera or the second camera using a modified optical center. As described herein, the optical center of an image may include a central point of an image or a center of an area of interest of the image. In some embodiments, the command may be provided to one or more of the first camera or the second camera, thereby causing the receiving camera to crop its generated image data according to the modified optical center before providing the cropped image data to a downstream component. In some embodiments, the command may be provided to an intermediary component between the first camera or the second camera and a downstream component (e.g., an ISP, a system-on-a-chip (SoC) or other component of an automation computing system), thereby causing the intermediary component to crop image data received from the first or second camera prior to providing the cropped image data to the downstream component. In some embodiments, the command may be provided to an ISP, SoC, or other downstream component (e.g., relative to the cameras) configured to process image data from the first camera and/or the second camera.

The command causes the receiving component to crop image data such that the optical center of the cropped image is shifted a number of pixels in the X-axis according to the disparity (e.g., where no object is detected in the sensor data) or based on a difference between calculated distances of an object based on the disparity and the sensor data, respectively. In some embodiments, such cropping an image may include generating a cropped image as a subset of the pixels of the original image such that the optical center is shifted by some amount. In some embodiments, such cropping may include removing some number of columns of pixels from one side of an image (e.g., left or right side) and adding some number of columns of pixels to the opposing side of the image such that the optical center is modified while maintaining the original horizontal resolution of the image. Such added pixels may include columns of pixels of some fixed color value, columns of pixels of predicted values, and the like.

As another example, where cropped images are generated prior to downstream processing based on some dynamically determined area of interest (e.g., in order to capture a higher fidelity cropped image, such as for a distance-view input to one or more models), the area to be cropped based on this dynamically determined area of interest may be shifted by some number of pixels.

For example, where the optical center is to be shifted by three pixels to the left, the area to be cropped may be adjusted to include an additional three columns of pixels on the left and to not include the three right-most columns of pixels that would otherwise be including using the unmodified optical center. As another example, the area to be cropped may be adjusted so as to not include the six right-most columns of pixels, effectively shifting the optical center by three pixels to the left. Other combinations of including additional columns of pixels or refraining from including particular columns of pixels may also be used so as to modify the optical center of a cropped image by some amount.

In some embodiments, providing 808, based on the disparity and the sensor data, a command to crop image data from one or more of the first camera or the second camera using a modified optical center may include determining the modified optical center. In some embodiments, determining the modified optical center may be based on the disparity in response to no objects being identified in the sensor data. Where no objects are identified in the sensor data (e.g., due to being out of range the sensor), no disparity should be present between the first image data from the first camera and the second image data from the second camera. Accordingly, where disparity is detected, the modified optical center of the first camera and/or the second camera may be determined by shifting the optical center based on the disparity, such as by an amount equal to the disparity. For example, assuming a four-pixel disparity, image data from the first camera or the second camera may be cropped using an optical center shifted four pixels to the left or right, depending on the direction of the disparity (e.g., whether an object appears four pixels apart or four pixels closer between the first image data and the second image data) and the particular camera whose image data will be cropped using the modified optical center.

In some embodiments, determining the modified optical center may be based on a difference between a distance of an object calculated as a function of the disparity and a distance of the object as detected in the sensor data. As is set forth above, the difference between the calculated distances may be converted into a pixel offset reflecting the degree to which the disparity is incorrect. Such a conversion may be performed, for example, using a linear regression or other function based on the difference in distances, the calculated distances of the object (e.g., using the disparity and the sensor, respectively), data describing various configuration or operational parameters of the cameras including focal length, and other data as can be appreciated.

Continuing with the example of an object calculated at a seventy-five-meter distance using the disparity and calculated at a fifty-meter distance using the sensor, this results in a twenty-five-meter difference. Using the approaches described above, this twenty-five-meter difference may be converted into an offset of three pixels. Accordingly, a command may be provided to crop the image data from the first camera or the second camera using a modified optical center shifted by three pixels.

Although the above examples describe providing a command to crop the image data from a single camera using a modified optical center, in some embodiments, one or more commands may be provided to crop the image data of each camera in the stereoscopic configuration. For example, assume that a four-pixel disparity is identified where no objects are detected by the sensor, or that an offset of four pixels is detected based on the difference in calculated distances of an object using the disparity and using the sensor data from a sensor. Where image data from a single camera is to be cropped using a modified optical center, such a modified optical center may be shifted by four pixels. However, in some embodiments, commands may be provided to crop image data from each camera in the stereoscopic configuration using modified optical centers to account for the disparity or pixel offset. For example, a first command may be provided to crop the image data from a first camera using an optical center shifted by two pixels and a second command may be provided to crop the image data from a second camera using an optical center shifted by two pixels, resulting in a net modification of optical centers of four pixels. As another example, a first command may be provided to crop the image data from a first camera using an optical center shifted by one pixel and a second command may be provided to crop the image data from a second camera using an optical center shifted by three pixels, resulting in a net modification of optical centers of four pixels.

The approaches described herein for dynamic calibration of cameras in a stereoscopic configuration may be performed in response to a variety of events. As an example, in some embodiments, calibration may be performed at system start and/or at a predefined time interval. As another example, where the stereoscopic configuration is implemented in an autonomous vehicle, calibration may be performed in response to detecting some event that may cause movement of one or more cameras in the stereoscopic configuration. Such events may include, for example, detecting particular road conditions that vibrate the vehicle so as to potentially move one or more of the cameras, detecting a collision or sharp acceleration or deceleration, or other events as can be appreciated. This will allow for the cameras to be recalibrated should such an event cause one or more of the cameras to move so as to require recalibration. In some embodiments, calibrating the stereoscopic cameras may be performed while the autonomous vehicle is operating in an autonomous driving mode. In some embodiments, calibrating the stereoscopic cameras may be performed while the autonomous vehicle is operating in a non-autonomous driving mode. In some embodiments, calibrating the stereoscopic cameras may be restricted to a particular driving mode (e.g., autonomous or non-autonomous) or may be performed independent of any particular driving mode. In some embodiments, calibrating the stereoscopic cameras may be performed while the autonomous vehicle is changed from a manual mode to an autonomous mode.

For further explanation, FIG. 9 sets forth a flowchart of another example method of dynamic calibration of cameras in a stereoscopic configuration according to some embodiments of the present disclosure. The method of FIG. 9 is similar to FIG. 8 in that the method of FIG. 9 also includes: determining 802 a disparity between first image data from a first camera and second image data from a second camera, wherein the first camera and the second camera are in a stereoscopic configuration; and adjusting 804 one or more of the first camera or the second camera, based on the disparity and sensor data from a sensor other than the first camera and the second camera, to calibrate the stereoscopic configuration of the first camera and the second camera to achieve stereoscopic camera distance functionality, including: modifying 806, based on the disparity and the sensor data, data describing a relative positioning of the first camera and the second camera; or providing 808, based on the disparity and the sensor data, a command to crop image data from one or more of the first camera or the second camera using a modified optical center.

The method of FIG. 9 differs from FIG. 8 in that the method of FIG. 9 includes generating 902 one or more autonomous driving decisions (e.g., after calibration). Assume that the stereoscopic configuration of cameras is implemented in an autonomous vehicle. Accordingly, one or more driving decisions may be based on image data from the stereoscopic cameras, including calculating the distance to objects captured in the image data. In embodiments where adjusting 802 one or more of the first camera or the second camera includes modifying 806 data describing the relative positioning of the first camera and the second camera, the data describing the relative positioning of the first camera and the second camera may be used in generating 902 the one or more autonomous driving decisions. For example, the data modified by calibration may be provided as input to one or more models and used to calculate distances of objects detected in image data from the first camera and the second camera. Such calculated distances may then be used in generating particular autonomous driving decisions.

Continuing with this example, in some embodiments, the data describing the relative positioning of the cameras may be loaded periodically (e.g., according to some time interval), with the most recently loaded version being used to generate 902 the autonomous driving decisions. In some embodiments, the data describing the relative positioning of the cameras may be loaded or reloaded in response to the data being modified due to calibration. For example, in response to modifying the data describing the relative positioning of the cameras, a command or signal may be provided to some process or component that causes the data to be loaded or reloaded. Thus, processes that use the data describing the relative positioning of the cameras are notified when the data is changed due to calibration.

In embodiments where adjusting 802 one or more of the first camera or the second camera includes providing 808 a command to crop image data from one or more of the first camera or the second camera using a modified optical center, generating 902 the one or more autonomous driving decisions may be performed based on cropped image data from one or more of the first camera or the second camera. For example, the cropped image data may be provided as input to one or more models for calculating the distance of objects relative to the autonomous vehicle captured in image data from the first camera and the second camera. The cropped image data may also be used as input to other models or functions that facilitate generating 902 the one or more autonomous driving decisions.

In some embodiments, additional processing or transformations of images from the first camera or the second camera may also be performed prior to or in conjunction with using the image data for generating 902 autonomous driving decisions. For example, disparities in the Y-axis of images from the first camera or the second camera may be accounted for or normalized by shifting one or more of the image data from the first camera or the image data from the second camera to align like pixels in the Y-axis. For example, assume that an object in image data from the first camera appears two pixels lower than the same object in image data from the second camera. To accommodate for this disparity, image data from the first camera may be shifted up two pixels, image data from the second camera may be shifted down two pixels, image data from the first camera may be shifted up one pixel and image data from the second camera shifted down one pixel, and the like. In other embodiments, disparities in the Y-axis may not be normalized or accommodated for by shifting image data in the Y-axis as disparities in the Y-axis do not affect distance calculations.

Figure 10:
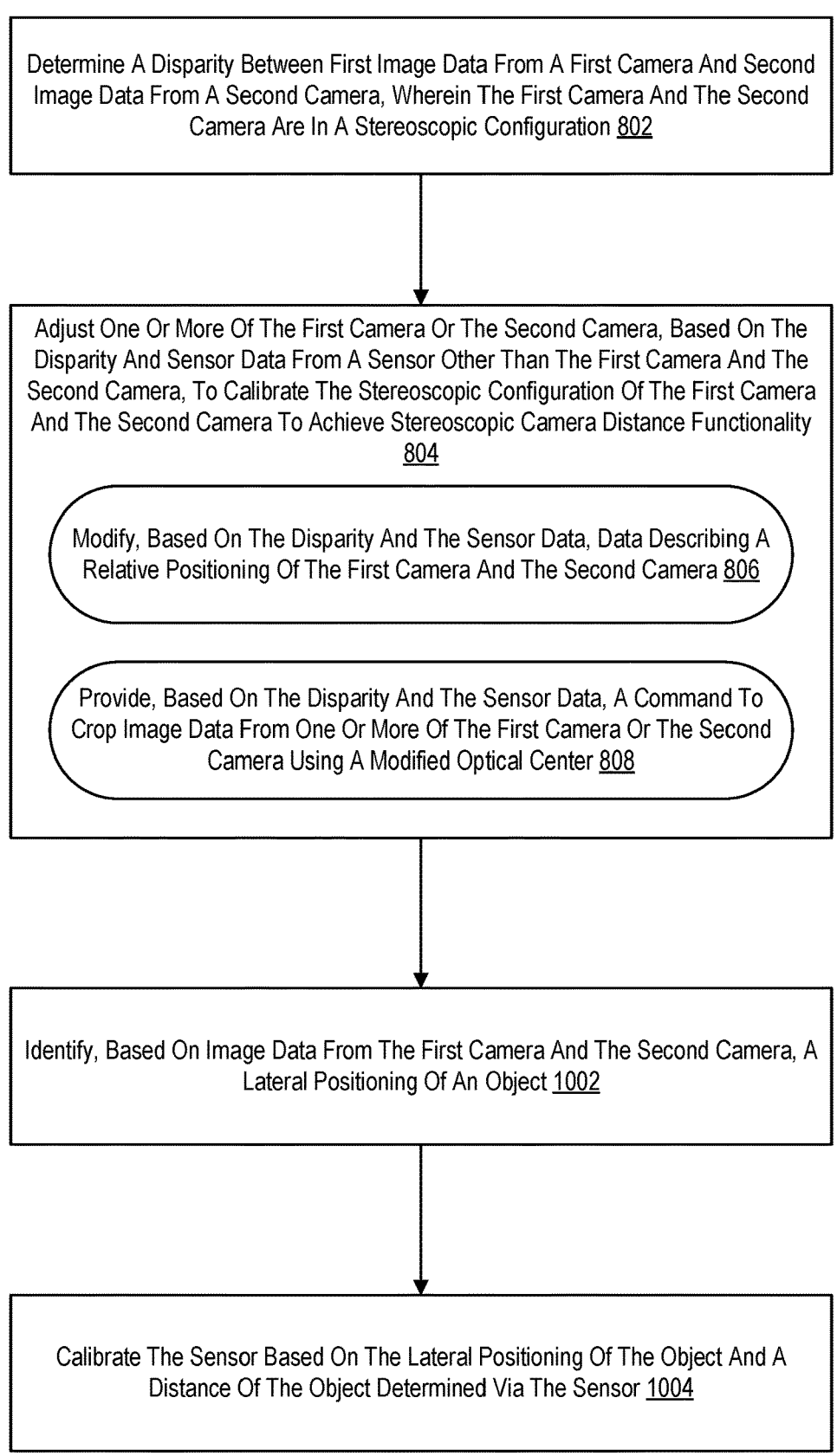
FIG. 10 is a flow chart of another example method for dynamic calibration of cameras in a stereoscopic configuration according to some embodiments of the present disclosure.

For further explanation, FIG. 10 sets forth a flowchart of another example method of dynamic calibration of cameras in a stereoscopic configuration according to some embodiments of the present disclosure. The method of FIG. 10 is similar to FIG. 8 in that the method of FIG. 10 also includes: determining 802 a disparity between first image data from a first camera and second image data from a second camera, wherein the first camera and the second camera are in a stereoscopic configuration; and adjusting 804 one or more of the first camera or the second camera, based on the disparity and sensor data from a sensor other than the first camera and the second camera, to calibrate the stereoscopic configuration of the first camera and the second camera to achieve stereoscopic camera distance functionality, including: modifying 806, based on the disparity and the sensor data, data describing a relative positioning of the first camera and the second camera; or providing 808, based on the disparity and the sensor data, a command to crop image data from one or more of the first camera or the second camera using a modified optical center.

The method of FIG. 10 differs from FIG. 8 in that the method of FIG. 10 includes identifying 1002, based on image data from the first camera and the second camera (e.g., after adjusting 804 as described above), a lateral positioning of an object. In some embodiments, the lateral positioning may include an angle (e.g., in the X-axis) between the object and some other reference point. For example, the lateral positioning may include an angle between a line or ray projected from some reference point (e.g., relative to the stereoscopic cameras) to the object and a line or ray projected forward from the reference point, such as a line or ray projected from a forward facing of the stereoscopic cameras. In some embodiments, the lateral positioning may include a distance to the left or right relative to an autonomous vehicle or other system. In other words, the lateral positioning may include a horizontal component or projection on the X-axis of a vector directed towards the object and having a length equal to the distance calculated using the image data from the first camera and the second camera.

The method of FIG. 10 also includes calibrating 1004 the sensor based on the lateral positioning of the object and a distance of the object determined via the sensor. Particularly, calibrating 1004 the sensor may include calibrating the sensor for calculating the lateral positioning of objects relative to the sensor. In some embodiments, calibrating 1004 the sensor may include modifying one or more configuration or operational parameters of the sensor used in calculating the lateral positioning of objects detected by the sensor. In some embodiments, calibrating 1004 the sensor may include modifying some other data used in conjunction with the sensor data from the sensor for calculating the lateral positioning of objects detected by the sensor. Using the lateral positioning of the object as calculated using image data from the first camera and the second camera and a distance measurement of the object from the sensor, the sensor may thus be calibrated such that lateral positionings of the object calculated using the sensor conform to the lateral positioning of the object calculated using the image data. In some embodiments where the other sensor and the first and second camera are positioned at different locations on the vehicle, distance measurements from the other sensor and/or the first and second camera may be scaled or otherwise modified based on the difference in placement (e.g., a distance offset), a relative mounting angle, or other attributes related to their relative positioning as is described above.

For example, assume that, prior to calibrating 1004 the sensor, the sensor provides accurate measurement of distances, but it is unknown as to whether lateral positionings measured by the sensor are accurate. Using the accurate measurement of distances from the sensor, the first and second camera may be calibrated as described above. In other words, the first and second camera may be calibrated against the sensor. Once calibrated, the first and second camera may provide both accurate measurements of distance and accurate measurements of lateral positionings of objects. The lateral positionings of objects measured using the first and second camera may then be used to calibrate 1004 the sensor for calculating the lateral positionings of objects. In other words, after calibrating the first and second camera against the sensor, the sensor may then be calibrated against the first and second camera.

Figure 11:
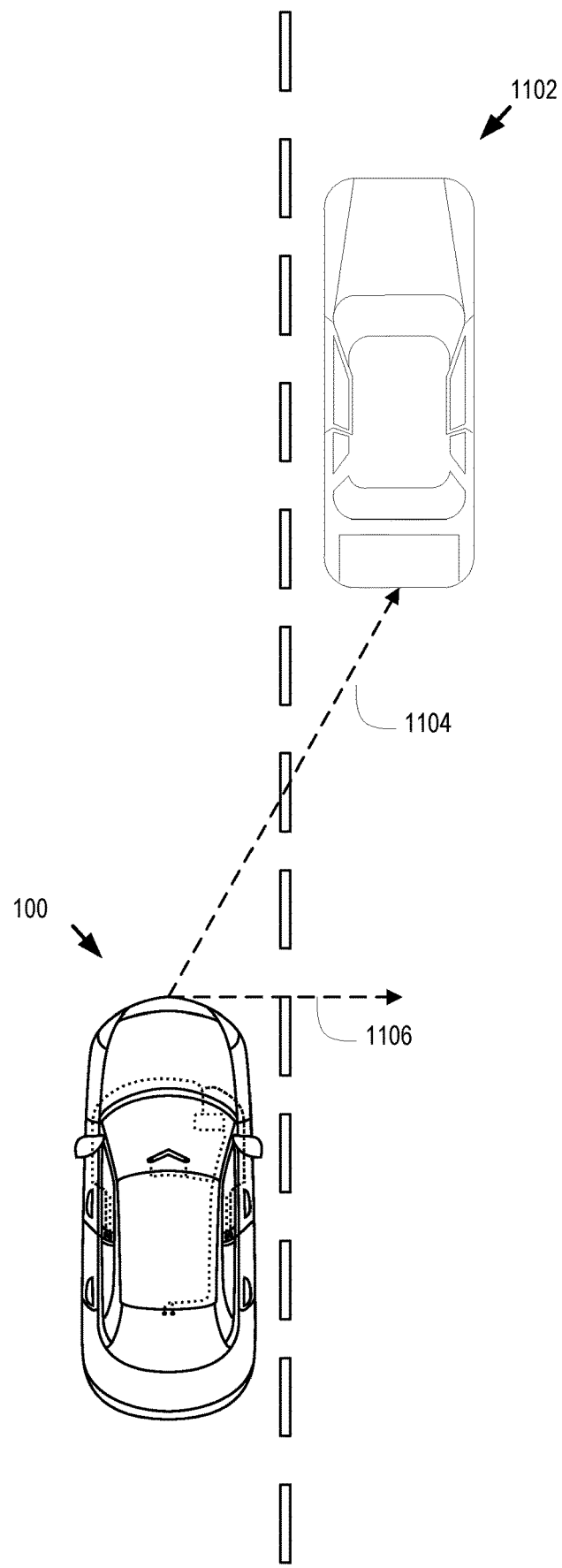
FIG. 11 is a pictorial diagram for calibrating sensors using lateral distance calculations from dynamically calibrated cameras according to some embodiments of the present disclosure.

Consider the example diagram of FIG. 11. FIG. 11 is an example diagram of an autonomous vehicle 100 driving along the same road as another vehicle 1102, with the other vehicle 1102 being located one lane further to the right than the autonomous vehicle 100. Alternate embodiments may include other objects being used to calculate distance or use of an infinity, horizon, or vanishing point. Here, the distance from the autonomous vehicle 100 to the other vehicle 1104 is shown as distance 1104. The lateral positioning of the other vehicle 1102 relative to the autonomous vehicle 100 is shown as lateral positioning 1106. In this example, assuming calibrated first and second cameras of the autonomous vehicle 100, the autonomous vehicle 100 may calculate the lateral positioning 1106 using video data from the first and second cameras. The autonomous vehicle 100 may then calculate the distance 1104 using the sensor. With the lateral positioning 1106 calculated using the first and second cameras and the distance 1104 calculated using the sensor, the autonomous vehicle 100 may then calibrate 1004 the sensor to calculate lateral positionings of other objects relative to the autonomous vehicle 100.

In view of the explanations set forth above, the benefits of dynamic calibration of cameras in a stereoscopic configuration according to embodiments of the present disclosure include calibrating stereoscopic cameras to account for movement in one or more of the cameras and provide accurate distance calculation using stereoscopic image data.

Exemplary embodiments of the present disclosure are described largely in the context of a fully functional computer system for dynamic calibration of cameras in a stereoscopic configuration. The present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others. Any computer system having suitable programming means will be capable of executing the steps of the method of the disclosure as embodied in a computer program product. Although some of the exemplary embodiments described in this specification are oriented to software installed and executing on computer hardware, nevertheless, alternative embodiments implemented as firmware or as hardware are well within the scope of the present disclosure.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood that any of the functionality or approaches set forth herein may be facilitated at least in part by artificial intelligence applications, including machine learning applications, big data analytics applications, deep learning, and other techniques. Applications of such techniques may include: machine and vehicular object detection, identification and avoidance; visual recognition, classification and tagging; algorithmic financial trading strategy performance management; simultaneous localization and mapping; predictive maintenance of high-value machinery; prevention against cyber security threats, expertise automation; image recognition and classification; question answering; robotics; text analytics (extraction, classification) and text generation and translation; and many others.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method comprising:
    determining a disparity between first image data from a first camera and second image data from a second camera, wherein the first camera and the second camera are in a stereoscopic configuration, and wherein the disparity comprises a difference in placement of one or more objects in the first image data relative to the second image data; and
    adjusting one or more of the first camera or the second camera, based on the disparity and sensor data from a sensor other than the first camera or the second camera, to calibrate the stereoscopic configuration of the first camera and the second camera to achieve stereoscopic camera distance functionality.

2. The method of claim 1, wherein adjusting one or more of the first camera or the second camera comprises modifying, based on the disparity and the sensor data, data describing a relative positioning of the first camera and the second camera.

3. The method of claim 2, wherein modifying the data comprises modifying the data based on the disparity in response to no objects being identified in the sensor data.

4. The method of claim 2, wherein modifying the data comprises modifying the data based on a difference between a first distance of an object identified in the sensor data and a second distance of the object calculated as a function of the disparity.

5. The method of claim 1, wherein adjusting one or more of the first camera or the second camera comprises providing, based on the disparity and the sensor data, a command to crop image data from one or more of the first camera or the second camera to generate cropped image data.

6. The method of claim 5, wherein providing the command comprises determining an optical center of the cropped image data based on the disparity in response to no objects being identified in the sensor data.

7. The method of claim 5, wherein providing the command comprises determining an optical center of the cropped image data based on a difference between a first distance of an object identified in the sensor data and a second distance of the object calculated as a function of the disparity.

8. The method of claim 1, further comprising generating one or more autonomous driving decisions based on image data from the first camera and the second camera.

9. The method of claim 1, wherein calculating the disparity and adjusting one or more of the first camera and the second camera are performed during an autonomous driving mode of an autonomous vehicle.

10. An apparatus comprising at least one processor and memory storing instructions that, when executed, cause the at least one processor to perform steps comprising:
    determining a disparity between first image data from a first camera and second image data from a second camera, wherein the first camera and the second camera are in a stereoscopic configuration, and wherein the disparity comprises a difference in placement of one or more objects in the first image data relative to the second image data; and
    adjusting one or more of the first camera or the second camera, based on the disparity and sensor data from a sensor other than the first camera or the second camera, to calibrate the stereoscopic configuration of the first camera and the second camera to achieve stereoscopic camera distance functionality.

11. The apparatus of claim 10, wherein adjusting one or more of the first camera or the second camera comprises modifying, based on the disparity and the sensor data, data describing a relative positioning of the first camera and the second camera.

12. The apparatus of claim 11, wherein modifying the data comprises modifying the data based on the disparity in response to no objects being identified in the sensor data.

13. The apparatus of claim 11, wherein modifying the data comprises modifying the data based on a difference between a first distance of an object identified in the sensor data and a second distance of the object calculated as a function of the disparity.

14. The apparatus of claim 10, wherein adjusting one or more of the first camera or the second camera comprises providing, based on the disparity and the sensor data, a command to crop image data from one or more of the first camera or the second camera to generate cropped image data.

15. The apparatus of claim 14, wherein providing the command comprises determining an optical center of the cropped image data based on the disparity in response to no objects being identified in the sensor data.

16. The apparatus of claim 14, wherein providing the command comprises determining an optical center of the cropped image data based on a difference between a first distance of an object identified in the sensor data and a second distance of the object calculated as a function of the disparity.

17. The apparatus of claim 10, wherein the steps further comprise comprising generating one or more autonomous driving decisions based on image data from the first camera and the second camera.

18. The apparatus of claim 10, wherein calculating the disparity and adjusting one or more of the first camera and the second camera are performed during an autonomous driving mode of an autonomous vehicle.

19. A computer program product disposed upon a non-transitory computer readable medium, the computer program product comprising computer program instructions that, when executed, cause a computer system to carry out steps comprising:
  determining a disparity between first image data from a first camera and second image data from a second camera, wherein the first camera and the second camera are in a stereoscopic configuration, and wherein the disparity comprises a difference in placement of one or more objects in the first image data relative to the second image data; and
  adjusting one or more of the first camera or the second camera, based on the disparity and sensor data from a sensor other than the first camera or the second camera, to calibrate the stereoscopic configuration of the first camera and the second camera to achieve stereoscopic camera distance functionality.

20. The computer program product of claim 19, wherein adjusting one or more of the first camera or the second camera comprises modifying, based on the disparity and the sensor data, data describing a relative positioning of the first camera and the second camera.

* * * * *